US008295614B2

(12) United States Patent
Ishiyama

(10) Patent No.: US 8,295,614 B2
(45) Date of Patent: Oct. 23, 2012

(54) COLLATION APPARATUS AND COLLATION METHOD

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 1044 days.

(21) Appl. No.: 12/297,136

(22) PCT Filed: Apr. 12, 2007

(86) PCT No.: PCT/JP2007/058477
§ 371 (c)(1),
(2), (4) Date: Oct. 14, 2008

(87) PCT Pub. No.: WO2007/119870
PCT Pub. Date: Oct. 25, 2007

(65) Prior Publication Data
US 2009/0180672 A1 Jul. 16, 2009

(30) Foreign Application Priority Data

Apr. 14, 2006 (JP) .................................. 2006-112048

(51) Int. Cl.
*G06K 9/62* (2006.01)
*G06K 9/00* (2006.01)
*G06K 9/64* (2006.01)
*G06K 9/68* (2006.01)

(52) U.S. Cl. ........ 382/215; 382/154; 382/209; 382/216; 382/217; 382/218; 382/219

(58) Field of Classification Search .................. 382/154, 382/209, 215–223
See application file for complete search history.

(56) References Cited

U.S. PATENT DOCUMENTS

| 7,756,325 | B2 * | 7/2010 | Vetter et al. .................... 382/154 |
| 2002/0097906 | A1 * | 7/2002 | Ishiyama ....................... 382/154 |
| 2006/0078172 | A1 * | 4/2006 | Zhang et al. .................. 382/118 |
| 2006/0120571 | A1 * | 6/2006 | Tu et al. ........................ 382/118 |
| 2006/0280343 | A1 * | 12/2006 | Lee et al. ....................... 382/118 |

OTHER PUBLICATIONS

Volker Blanz, Thomas Vetter, Face Recognition Based on Fitting a 3D Morphable Model, IEEE Trans. PAMI, vol. 25, No. 9, 2003, pp. 1063-1074.
Sami Romdhani, Volker Blanz, Face Identification by Fitting a 3D Morphable Model using Linear Shape and Texture Error Functions, Proc. ECCV 2002, 2002, pp. 1-15. Andreas Lanitis et al., Automatic Interpretation and Coding of Face Images Using Flexible Models, IEEE Transactions on Pattern Analysis and Maching Intelligence, vol. 19, No. 7, Jul. 1997.
Sami Romdhani et al., Face Identification by Fitting a 3D Morphable Model using Linear Shape and Texture Error Functions, pp. 1-15, 2002.
Volker Blanz et al., Face Recognition BAsed on Fitting a 3D Morphable Model, IEEE Transaction on Pattern Analysis and Machine Intelligence, vol. 25, No. 9, Sep. 2003.

* cited by examiner

*Primary Examiner* — Anand Bhatnagar
*Assistant Examiner* — Soo Park
(74) *Attorney, Agent, or Firm* — Young & Thompson

(57) ABSTRACT

A 2D model fitting means 1201 estimates values of parameters optimum to generate a probe model image similar to a probe image and a gallery model image similar to a gallery image with an image variation model 1204. At that time, among a plurality of parameters of the image variation model 1204, the value of a parameter of which sameness between the probe image and the gallery image is to be judged as a target parameter is set to be the same for both images. A model goodness-of-fit evaluation means 1202 computes a model goodness of fit for the probe model image and the gallery model image to the probe image and the gallery image under the estimated parameters. A collation means 1203 compares the model goodness of fit with a threshold value to judge the sameness between the probe image and the gallery image.

44 Claims, 14 Drawing Sheets

COLLATION APPARATUS AND COLLATION METHOD

TECHNICAL FIELD

The present invention relates to a collation apparatus and a collation method for recognizing a kind of a subject, a state of a subject, an environment under which a subject was photographed, or the like by collating three-dimensional data or an image taken under variable diverse environments with reference data.

BACKGROUND ART

There are some methods of recognizing an element including a kind of a subject included in an image, a state of the subject (a pose, a facial expression, or the like), and an environment under which the image was photographed (illumination conditions, a type of a camera, or the like). As one of those methods, there has been known a method of estimating a similarity between an image of a recognition target and a reference image of a comparison target to thereby judge the sameness between those images.

In a case where elements other than an element sought to be recognized are different between the recognition target image and the reference image, however, if variations of images caused by such other elements become greater than variations resulting from the element sought to be recognized, it is difficult to recognize the image as being the same as the reference image even in a case where the element to be recognized is actually the same for both images. Thus, there is a problem that the recognition performance is degraded.

For example, in a face collation system for performing personal identification with inputs of facial images of persons, an element sought to be recognized includes an individuality of a face, and other image variable elements include a pose of a face, illumination conditions and the like. If variations of image luminance values that are caused by changes of the pose or illumination become greater than variations of image luminance values that are caused by individual differences, miscollation is caused such that image data of the same person are judged as image data of different persons.

In order to improve those problems, various methods have been proposed to utilize an image variation model which is produced by modeling the relationship between variable elements that may cause image variations and their resultant image variations based on a prepared group of learning data or the like and which is capable of generating an image under conditions for which elements are given as parameters. Specifically, a model fitting process is performed to estimate values of parameters which generate from the image variation model an image that is closest to a given input image. The recognition is performed based on a value of a parameter sought to be recognized among the obtained parameters.

An example of the aforementioned technique is disclosed by Prior Art Reference 2 listed below. This technique produces a model capable of generating a three-dimensional facial model with elements for individual differences, i.e., parameters representing an individuality of a three-dimensional shape and a texture of a face, based on three-dimensional facial models of many persons which have previously been collected.

Furthermore, with parameters representing a pose of a face and illumination conditions, a facial image under the conditions represented by the parameters for the pose and illumination is generated from the three-dimensional facial model data by using computer graphics. The aforementioned model is an example of an image variation model capable of generating a facial image under conditions in which an individuality, a pose of a face, and illumination conditions are given as parameters and is referred to as a facial morphable model (hereinafter abbreviated as MM).

Prior Art Reference 2 discloses a technique of fitting MM to each of a reference image (hereinafter referred to as a gallery image) and a recognition target image (hereinafter referred to as a probe image) to estimate parameters representing elements of an individuality, a pose, and illumination, and of collating both images based on a group of the estimated parameters. Specifically, the following two techniques are disclosed.

(1) Among the group of the estimated parameters, a similarity only between target parameters is computed for collation. (2) The value of a target parameter is set to be a value obtained from a recognition target image, and the values of other parameters are set to be values estimated from a registered image. An image at that time is generated as a comparison image from MM. A similarity between the generated image and the registered image is computed for collation.

The technique (1) is configured as shown in FIG. 1. In FIG. 1, a model fitting means 1001 determines parameters of an image variation model 1003 so that a generated image becomes most similar to a gallery image Ig. Among a series of parameters determined at that time, a parameter corresponding to an object of the collation is defined as a target parameter ptg, and other parameters are defined as an external parameter peg. A model image I'g is an image generated at that time. For example, in a case where an individual face is to be collated, the target parameter ptg includes a parameter for an individuality, and the external parameter peg includes parameters representing elements such as a pose and illumination. Similarly, a model fitting means 1002 determines a target parameter ptp and an external parameter pep of the image variation model 1003 so as to obtain a model image I'p that is most similar to a probe image Ip. Then a parameter collation means 1004 computes a similarity between the target parameters ptg and ptp. This computation result is defined as a similarity between the gallery image Ig and the probe image Ip. If there are a plurality of gallery images Ig, similar computations are performed for other gallery images. A gallery image Ig having the highest similarity is used as the collation result.

In the technique (2), while a value of the target parameter ptp computed from the probe image is used as the value of the target parameter and a value of the external parameter peg estimated from the gallery image is used as the values of other parameters, an image is generated as a comparison image from the image variation model 1003. A similarity between the comparison image and the original gallery image Ig is computed. This similarity is defined as a similarity between the gallery image Ig and the probe image Ip. If there are a plurality of gallery images Ig, similar computations are performed for other gallery images. A gallery image Ig having the highest similarity is used as the collation result.

Prior Art Reference 1: Japanese laid-open patent publication No. 2002-157595

Prior Art Reference 2: Volker Blanz, Thomas Vetter, "Face Recognition Based on Fitting a 3D Morphable Model," IEEE Trans. PAMI, vol. 25, no. 9, pp. 1063-1074, 2003

Prior Art Reference 3: Sami Romdhani, Volker Blanz, Thomas Vetter, "Face Identification by Fitting a 3D Morphable Model using Linear Shape and Texture Error Functions," Proc. ECCV 2002, pp. 3-19, 2002

Prior Art Reference 4: Andreas Lanitis, Chris J. Taylor, Timothy F. Cootes, "Automatic Interpretation and Coding of Face Images Using Flexible Models," IEEE Trans. PATTERN ANALYSIS AND MACHINE INTELLIGENCE, VOL. 19, NO. 7, JULY 1997

DISCLOSURE OF INVENTION

Problems to be Solved by the Invention

However, as pointed out in the aforementioned Prior Art Reference 3, which presents speed-enhancement technology of a fitting process in the technique described in the aforementioned Prior Art Reference 2, both of the techniques (1) and (2) perform recognition based on a similarity between estimated values of parameters. Accordingly, the collation performance is greatly affected by an absolute accuracy of the model fitting process. This holds true in the case of Prior Art Reference 3.

The model fitting process is a nonlinear optimization process of a number of parameters. Therefore, the estimation becomes unstable depending on situations. Furthermore, local solutions tend to be obtained. Moreover, the accuracy of estimate values is affected by given initial values. The model fitting process has problems as described above. Thus, it is difficult to enhance an absolute accuracy of the model fitting process. According to the techniques (1) and (2), if the accuracy of an estimated value of a parameter is lowered, a difference is not clearly produced between a similarity between a probe image and a gallery image that correctly fits to the probe image and similarities between the probe image and other gallery images. Accordingly, the collation accuracy is problematically lowered to a large extent.

An object of the present invention is to reduce influence due to a decrease of an absolute accuracy of a fitting process when variable elements are estimated by fitting an image variation model or a three-dimensional-data variation model to an image or three-dimensional data to be recognized.

Means to Solve the Problems

A collation apparatus according to a first aspect of the present invention is a collation apparatus for collating target data of an image or three-dimensional data of an object with reference data, and the collation apparatus is characterized by comprising storage means for storing a variation model capable of generating model data of an image or three-dimensional data of an object by adjusting values of a plurality of parameters, model fitting means for using the variation model stored in the storage means, for defining, among the plurality of parameters, a parameter of which sameness between the target data and the reference data is to be judged as a target parameter and other parameters as an external parameter, and for estimating values of the parameters optimum to generate target model data similar to the target data and reference model data similar to the reference data from the variation model under a condition in which the target parameter is set to be the same for the target data and the reference data, and model goodness-of-fit evaluation means for computing a model goodness of fit of the target model data and the reference model data to the target data and the reference data under the estimated parameters.

A collation apparatus according to a second aspect of the present invention is characterized by comprising collation means for comparing the computed model goodness of fit with a predetermined threshold value to judge the sameness of the target parameter between the target data and the reference data.

A collation apparatus according to a third aspect of the present invention is characterized by comprising collation means for repeating processes of the model fitting means and the model goodness-of-fit evaluation means on each combination of each of plural pieces of reference data and the target data and for setting a value of the target parameter in a combination having the best model goodness of fit as an estimate value of the target parameter for the target data.

A collation apparatus according to a fourth aspect of the present invention is characterized by comprising collation means for repeating processes of the model fitting means and the model goodness-of-fit evaluation means on each combination of each of plural pieces of reference data and the target data and for setting a value computed from the target parameter in a plurality of combinations having a model goodness of fit better than a predetermine threshold value as an estimate value of the target parameter for the target data.

A collation apparatus according to a fifth aspect of the present invention is characterized in that the model goodness-of-fit evaluation means computes an error between the generated target model data and the target data and an error between the generated reference model data and the reference data, and computes the model goodness of fit from the computed errors.

A collation apparatus according to a sixth aspect of the present invention is characterized in that the model goodness-of-fit evaluation means computes a parameter confidence factor representing certainty of the estimated values of the parameters with reference to predetermined parameter reference information, and computes the model goodness of fit from the computed parameter confidence factor.

A collation apparatus according to a seventh aspect of the present invention is characterized in that the model goodness-of-fit evaluation means computes an error between the generated target model data and the target data and an error between the generated reference model data and the reference data and computes a parameter confidence factor representing certainty of the estimated values of the parameters with reference to predetermined parameter reference information, and computes the model goodness of fit from the computed errors and parameter confidence factor.

A collation apparatus according to an eighth aspect of the present invention is characterized in that the parameter reference information includes an allowable range of the value of the parameter.

A collation apparatus according to a ninth aspect of the present invention is characterized in that the parameter reference information includes a correct value of the parameter.

A collation apparatus according to a tenth aspect of the present invention is characterized in that the parameter reference information includes a probability distribution of the value of the parameter.

A collation apparatus according to an eleventh aspect of the present invention is characterized in that the model fitting means estimates values of the parameters optimum to generate target individual model data similar to the target data from the variation model and values of the parameters optimum to generate reference individual model data similar to the reference data from the variation model, under a condition in which the value of the target parameter is not necessarily the same for the target data and the reference data, and the model goodness-of-fit evaluation means sets the estimated values of the parameters for the target individual model data and the estimated values of the parameters for the reference individual model data as the parameter reference information.

A collation apparatus according to a twelfth aspect of the present invention is characterized in that the model fitting means estimates values of the parameters optimum to generate target individual model data similar to the target data from the variation model and values of the parameters optimum to generate reference individual model data similar to the reference data from the variation model, under a condition in which the value of the target parameter is not necessarily the same for the target data and the reference data, and the model goodness-of-fit evaluation means computes the model goodness of fit with additional consideration of at least one of an error between the target individual model data and the target data, an error between the reference individual model data and the reference data, an error between the target model data and the target individual model data, and an error between the reference model data and the reference individual model data.

A collation apparatus according to a thirteenth aspect of the present invention is characterized in that the variation model is an image variation model including three-dimensional models of various objects for selecting a three-dimensional model of a specified object according to a parameter specifying the object, deforming the selected three-dimensional model according to a parameter such as a state or a pose of the object, an illumination condition, or a characteristic of a camera, and generating an image under a condition the parameter represents by using computer graphics.

A collation apparatus according to a fourteenth aspect of the present invention is characterized in that the variation model is an image variation model for computing a three-dimensional model of an object in a state according to a parameter specifying an individuality or a state of the object, deforming the computed three-dimensional model according to a parameter such as a pose of the object, an illumination condition, or a characteristic of a camera, and generating an image under a condition the parameter represents by using computer graphics.

A collation apparatus according to a fifteenth aspect of the present invention is characterized in that the variation model is a three-dimensional data variation model including three-dimensional models of various objects for selecting a three-dimensional model of a specified object according to a parameter specifying the object and deforming the selected three-dimensional model according to a parameter such as a state or a pose of the object, an illumination condition, or a characteristic of a camera.

A collation apparatus according to a sixteenth aspect of the present invention is characterized in that the variation model is a three-dimensional data variation model for computing a three-dimensional model of an object in a state according to a parameter specifying an individuality or a state of the object and deforming the computed three-dimensional model according to a parameter such as a pose of the object, an illumination condition, or a characteristic of a camera.

A collation apparatus according to a seventeenth aspect of the present invention is characterized in that the target parameter is a parameter describing a kind of an object, and the collation means is means for judging whether or not an object of the target data is the same as an object of the reference data.

A collation apparatus according to an eighteenth aspect of the present invention is characterized in that the variation model is a model for generating an image or three-dimensional data of a face, the target parameter is a parameter describing an individuality of a person, and the collation means is means for determining whether or not a person of the target data is the same as a person of the reference data.

A collation apparatus according to a nineteenth aspect of the present invention is characterized in that the target parameter is a parameter specifying a position or a pose of an object, and the collation means is means for determining whether or not a position or a pose of an object of the target data is the same as a position or a pose of an object of the reference data.

A collation apparatus according to a twentieth aspect of the present invention is characterized in that the variation model is a model for generating an image or three-dimensional data of a face, the target parameter is a parameter specifying a facial expression of a person, and the collation means is means for determining whether or not a facial expression of the target data is the same as a facial expression of the reference data.

A collation method according to a first aspect of the present invention is a collation method of collating target data of an image or three-dimensional data of an object with use of a computer and is characterized by including a first step for the computer to use a variation model capable of generating model data of an image or three-dimensional data of an object by adjusting values of a plurality of parameters, to define, among the plurality of parameters, a parameter of which sameness between the target data and the reference data is to be judged as a target parameter and other parameters as an external parameter, and to estimate values of the parameters optimum to generate target model data similar to the target data and reference model data similar to the reference data from the variation model under a condition in which the target parameter is set to be the same for the target data and the reference data, and a second step for the computer to compute a model goodness of fit of the target model data and the reference model data to the target data and the reference data under the estimated parameters.

A collation method according to a second aspect of the present invention is characterized by further including a third step for the computer to compare the computed model goodness of fit with a predetermined threshold value to judge the sameness of the target parameter between the target data and the reference data.

A collation method according to a third aspect of the present invention is characterized by further including a third step for the computer to repeat the first and second steps on each combination of each of plural pieces of reference data and the target data and to set a value of the target parameter in a combination having the best model goodness of fit as an estimate value of the target parameter for the target data.

A collation method according to a fourth aspect of the present invention is characterized by further including a third step for the computer to repeat the first and second steps on each combination of each of plural pieces of reference data and the target data and to set a value computed from the target parameter in a plurality of combinations having a model goodness of fit better than a predetermine threshold value as an estimate value of the target parameter for the target data.

A collation method according to a fifth aspect of the present invention is characterized in that the second step comprises computing an error between the generated target model data and the target data and an error between the generated reference model data and the reference data, and computing the model goodness of fit from the computed errors.

A collation method according to a sixth aspect of the present invention is characterized in that the second step comprises computing a parameter confidence factor representing certainty of the estimated values of the parameters with reference to predetermined parameter reference information, and computing the model goodness of fit from the computed parameter confidence factor.

A collation method according to a seventh aspect of the present invention is characterized in that the second step comprises computing an error between the generated target model data and the target data and an error between the generated reference model data and the reference data, computing a parameter confidence factor representing certainty of the estimated values of the parameters with reference to predetermined parameter reference information, and computing the model goodness of fit from the computed errors and parameter confidence factor.

A collation method according to an eighth aspect of the present invention is characterized in that the parameter reference information includes an allowable range of the value of the parameter.

A collation method according to a ninth aspect of the present invention is characterized in that the parameter reference information includes a correct value of the parameter.

A collation method according to a tenth aspect of the present invention is characterized in that the parameter reference information includes a probability distribution of the value of the parameter.

A collation method according to an eleventh aspect of the present invention is characterized in that the computer estimates values of the parameters optimum to generate target individual model data similar to the target data from the variation model and values of the parameters optimum to generate reference individual model data similar to the reference data from the variation model, under a condition in which the value of the target parameter is not necessarily the same for the target data and the reference data, and the computer sets the estimated values of the parameters for the target individual model data and the estimated values of the parameters for the reference individual model data as the parameter reference information.

A collation method according to a twelfth aspect of the present invention is characterized in that the computer estimates values of the parameters optimum to generate target individual model data similar to the target data from the variation model and values of the parameters optimum to generate a reference individual model data similar to the reference data from the variation model, under a condition in which the value of the target parameter is not necessarily the same for the target data and the reference data, and computes the model goodness of fit with additional consideration of at least one of an error between the target individual model data and the target data, an error between the reference individual model data and the reference data, an error between the target model data and the target individual model data, and an error between the reference model data and the reference individual model data.

The present invention employs the following principles. In order to judge a similarity of an image variable element to be recognized between a probe image and a gallery image, estimation of a value of a parameter representing the element is not required. The similarity can be judged only if it is known whether the element is the same for both images, i.e., the certainty of the sameness is known. Furthermore, the present invention employs the following phenomena. With regard to a plurality of images having the same image variable element, a process of fitting an image variation model to both images can be performed somewhat accurately when a parameter representing the same element is set to have a common value. By contrast, with regard to a group of images having different image variable elements, the accuracy of a process of fitting an image variation model to both images is extremely worsened when a parameter representing those different elements is set to have a common value. These are also applicable to judgment of a similarity between a probe image and gallery data, between probe data and a gallery image, and between probe data and gallery data.

Specifically, according to the present invention, a variation model capable of generating model data of an image or three-dimensional data of an object by adjusting values of a plurality of parameters is used. Among the plurality of parameters, a parameter of which sameness between the target data and the reference data is to be judged is defined as a target parameter, and other parameters are defined as an external parameter. Values of the parameters optimum to generate target model data similar to the target data and reference model data similar to the reference data from the variation model under a condition in which the target parameter is set to be the same for the target data and the reference data are estimated. A model goodness of fit of the target model data and the reference model data to the target data and the reference data under the estimated parameters is computed. The computed model goodness of fit is compared with a predetermined threshold value to judge the sameness of the target parameter between the target data and the reference data.

For example, an error between the generated target model data and the target data and an error between the generated reference model data and the reference data may be computed. A value derived from the computed errors may be used as the model goodness of fit. Alternatively, for example, a parameter confidence factor representing certainty of the estimated values of the parameters may be computed with reference to predetermined parameter reference information (e.g., an allowable range of the value of the parameter, a correct value of the parameter, a probability distribution of the value of the parameter, or the like). A value derived from the computed parameter confidence factor may be used as the model goodness of fit. Furthermore, those values may be used in combination. Moreover, values of the parameters optimum to generate target individual model data similar to the target data from the variation model and values of the parameters optimum to generate reference individual model data similar to the reference data from the variation model may be estimated under a condition in which the value of the target parameter is not necessarily the same for the target data and the reference data. The estimated values of the parameters for the target individual model data and the estimated values of the parameters for the reference individual model data may be set as the parameter reference information.

Furthermore, values of the parameters optimum to generate target individual model data similar to the target data from the variation model and values of the parameters optimum to generate reference individual model data similar to the reference data from the variation model may be estimated under a condition in which the value of the target parameter is not necessarily the same for the target data and the reference data. The model goodness of fit may be computed with additional consideration of at least one of an error between the target individual model data and the target data, an error between the reference individual model data and the reference data, an error between the target model data and the target individual model data, and an error between the reference model data and the reference individual model data.

Effects of the Invention

According to the present invention, for the following reasons, influence due to decrease of an absolute accuracy of a fitting process can be reduced when variable elements are estimated by fitting an image variation model or a three-dimensional-data variation model to an image or three-dimensional data to be recognized. If a target parameter to be collated has different values for target data and reference data, then model data that are similar to both data cannot be obtained by a fitting process using a common target parameter. Therefore, a model goodness of fit is extremely worsened. By contrast, if the target parameter to be collated has the same value for both data, then model data that are similar to both data can always be obtained in principle. Therefore, a model goodness of fit has a good value. Using these phenomena, a significant difference can be produced in the values of the model goodness of fit between the case where the target parameter to be collated has the same value for both data and the case where the target parameter to be collated has different values for both data.

BEST MODE FOR CARRYING OUT THE INVENTION

Next, the best mode for carrying out the present invention will be described in detail with reference to the drawings.
(First Embodiment)

Figure 1:
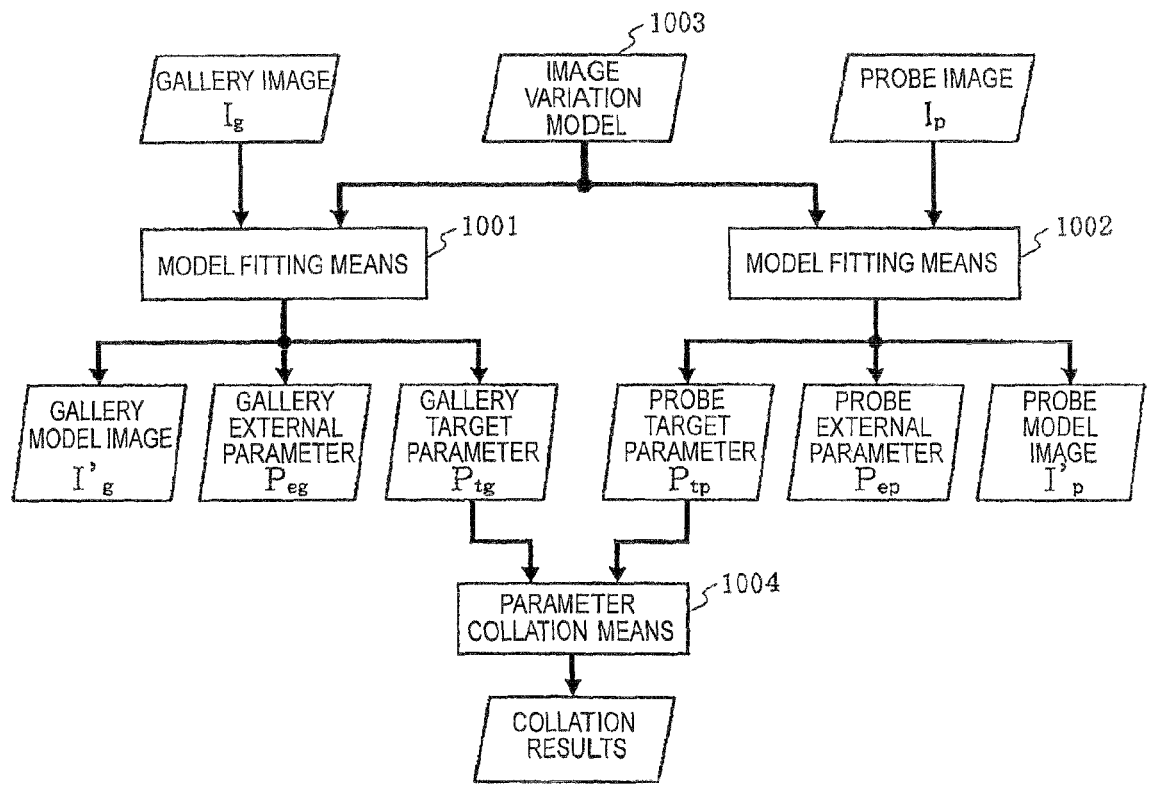
FIG. 1 is an explanatory diagram for the prior art.
Figure 2:
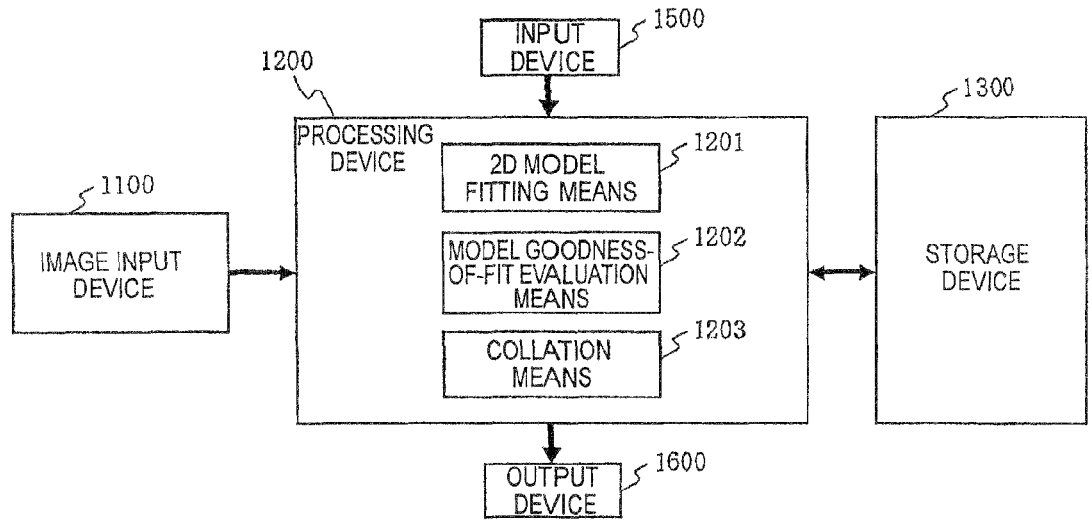
FIG. 2 is a block diagram of a first embodiment of the present invention.

Referring to FIG. 2, the present embodiment is formed by a processing device 1200 operable with a program control, and an image input device 1100, a storage device 1300, an input device 1500, and an output device 1600, which are connected to the processing device 1200. A probe image, which is a recognition target, is collated with a gallery image, which is a reference image.

The image input device 1100 is a device for inputting a probe image to the processing device 1200 and may be a camera or other devices for reading a probe image from a storage device, which is not shown in the drawings, or for receiving a probe image via a network.

The storage device 1300 stores programs executed by the processing device 1200 and various types of data used for collation. The various types of data include a gallery image and data relating to an image variation model. The gallery image may be prestored in the storage device 1300 or read together with a probe image each time it is needed.

The image variation model is a model that describes how photographed images vary according to diverse image variable elements such as a kind of an object, a state and a pose of the object, illumination conditions, and a camera. The image variation model is used to generate a model image under conditions of given diverse image variable elements. The data relating to the image variation model include all data required in a step of generating a model image.

One example of the image variation model is a model as described in the aforementioned Prior Art Reference 2 (referred to as Model 1). This model is an image variation model capable of generating facial images of various persons with given parameters representing an individuality of a 3D shape, an individuality of a texture, a facial expression, a pose of a face, illumination conditions, and characteristics of a camera by using computer graphics technology. In this case, 3D data of faces of a large number of persons are collected in advance. Principal component analysis is performed on the data of shapes and textures to compute a basic 3D data group and a basic texture group, which are stored in a storage unit.

Another example of the image variation model is a model as described in the aforementioned Prior Art Reference 1 (referred to as Model 2). This model has 3D shape data and basic illumination data of each person to be collated. When a person is specified with parameters representing a pose of a face, illumination, and characteristics of a camera, then the image variation model generates a facial image of the specified person under the specified conditions. In this case, a texture luminance value under variable illumination conditions is computed for a 3D model of each person's face. Principal component analysis is performed on those data to compute a basic texture group, which is stored in a storage unit.

The above examples of the image variation model have been described merely by way of example. Thus, various other image variation models may be used instead. Similarly, "Active Appearance Model" described in the aforementioned Prior Art Reference 4 or the like may also be used as an example of the image variation model using no three-dimensional data.

The processing device 1200 has a 2D model fitting means 1201, a model goodness-of-fit evaluation means 1202, and a collation means 1203.

Figure 3:
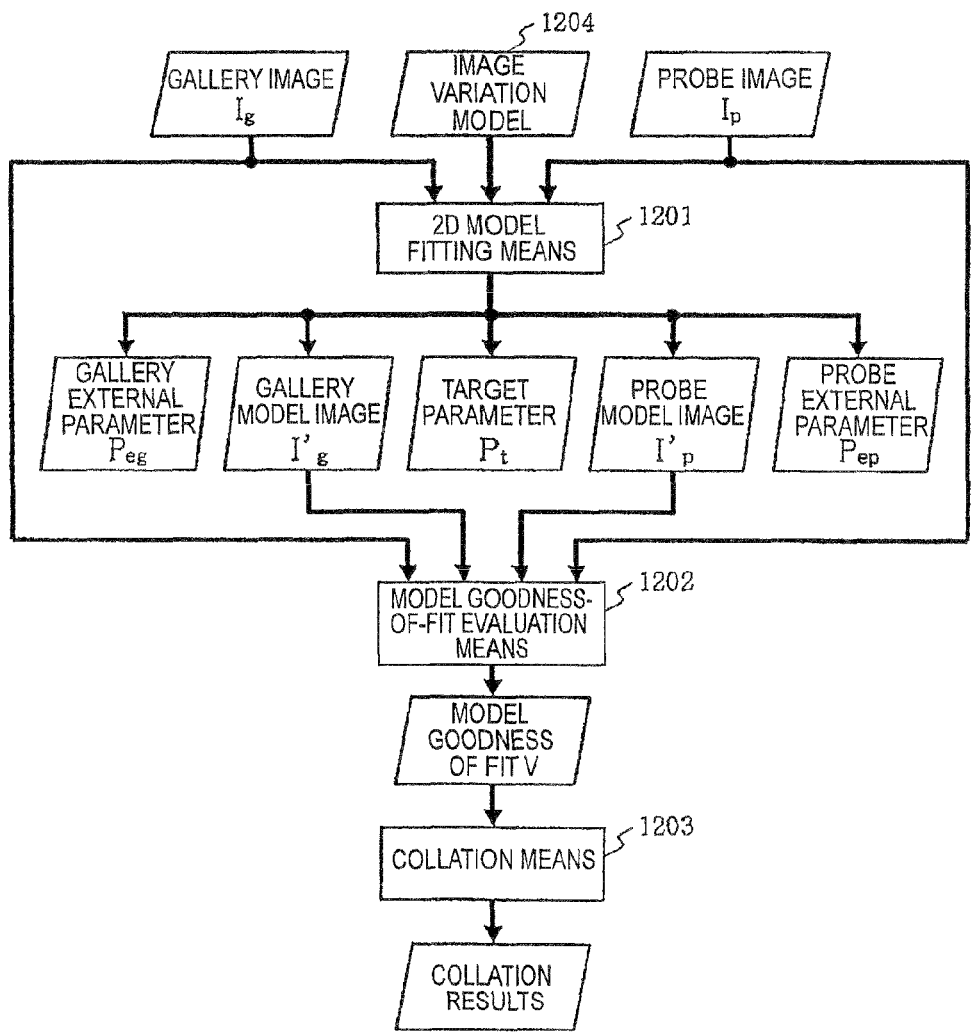
FIG. 3 is a diagram showing a flow of a process in the first embodiment of the present invention.

As shown in FIG. 3, the 2D model fitting means 1201 receives inputs of both of a gallery image Ig and a probe image IP. Assuming that a target parameter pt representing an element to be recognized has the same value for both images Ig and IP and that a parameter pe representing other variable elements may have different values for the images Ig and IP, values of those parameters pt and pe are computed by using an image variation model 1204 as described above so as to generate model images I'g and I'P that are closest to the images Ig and IP (model images in which the following cost function has a small value). This technique is different from a technique of independently estimating both of the target parameter pt and the external parameter pe for each of the probe image IP and the gallery image Ig, such as the technique described in the aforementioned Prior Art Reference 1. In other words, the target parameter pt and the external parameter pe are simultaneously estimated for both images on the assumption that the target parameter pt has the same value for both images. Here, the external parameter pe estimated for the gallery image Ig is denoted by peg, and the external parameter pe estimated for the probe image IP is denoted by pep.

For example, in a personal identification system for recognizing a person by using a facial image, the target parameter pt is a parameter representing an individuality, and the external parameter pe is a parameter relating to a pose of a face, illumination conditions, and characteristics of a camera. The parameter for a pose of a face includes a three-dimensional position coordinate of the face and three rotation angles representing a three-dimensional direction of the face. A three-dimensional vector representing a direction and strength of the illumination may be used as an example of the parameter for illumination conditions. The above configuration of the parameters has been described merely by way of example and may be changed in various ways according to an image variation model to be used.

Furthermore, for example, in a position pose estimation system for estimating a position or a pose of an object, the target parameter pt is a pose parameter, and the external parameter pe is a parameter relating to a type of the object, illumination conditions, and characteristics of a camera. If only a specified object is to be recognized, the parameter for a type of an object may be dispensed with. Furthermore, if only images having the same illumination conditions are to be recognized, the parameter for illumination conditions may be dispensed with. Thus, the parameters may be set as desired.

Figure 4:
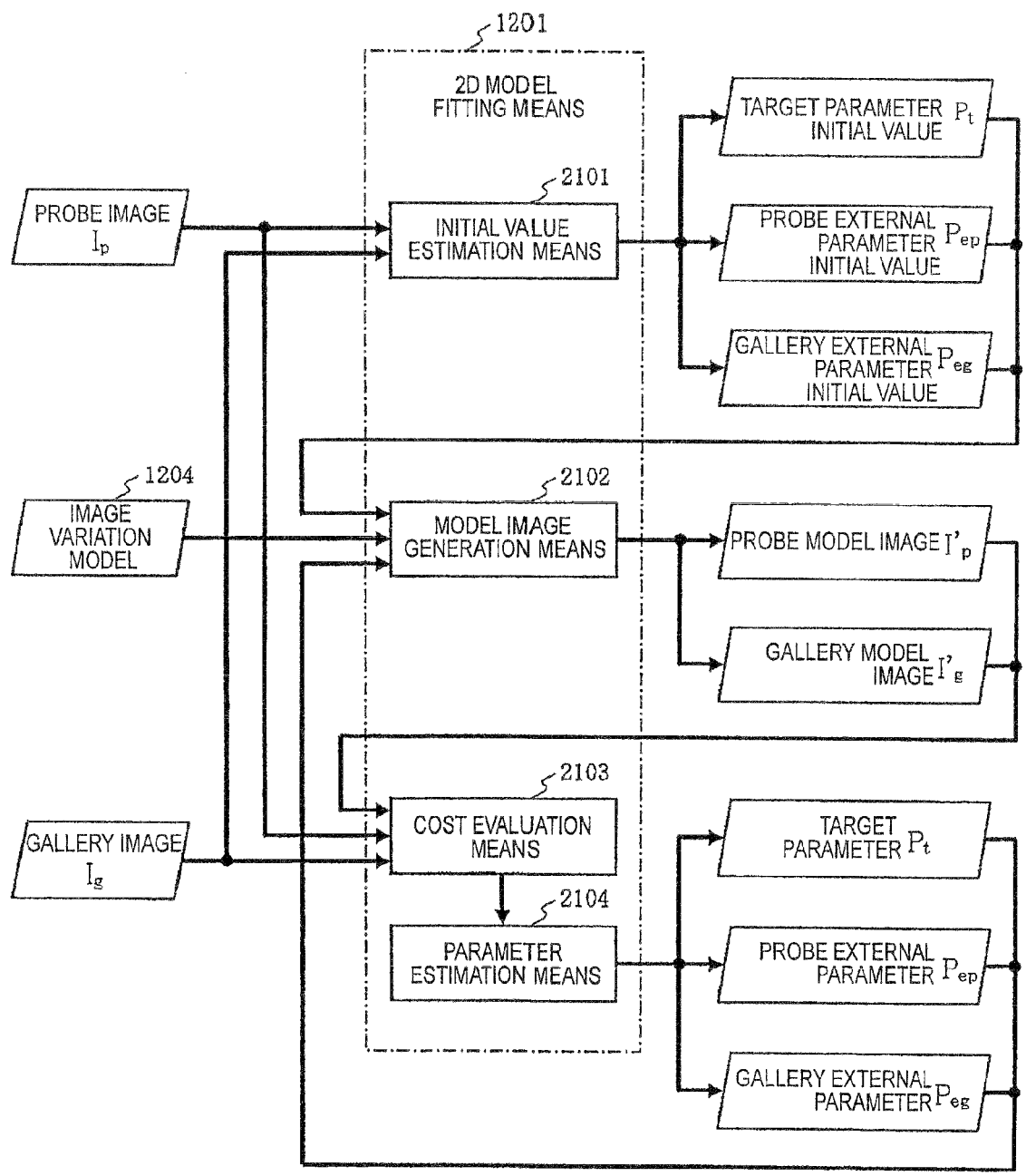
FIG. 4 is a diagram showing a configuration of a 2D model fitting means and its process in the first embodiment of the present invention.

Referring to FIG. 4, the 2D model fitting means 1201 has an initial value estimation means 2101, a model image generation means 2102, a cost evaluation means 2103, and a parameter estimation means 2104. Those means generally operate in the following manner.

The initial value estimation means 2101 computes initial values of the parameters pt, peg, and pep for image variable elements of the probe image IP and the gallery image Ig. Those values may be predetermined known values or values measured by a separate sensor or the like, or may be inputted as information added to the images IP and Ig. For example, in facial image recognition, when reference-point position data representing positions of eyes, a nose, and a mouth in a face within an image are set as additional information, an estimate value for a pose of a face can be computed as an initial value from the additional information.

As to the parameter for an individuality, a mean value may be used as an initial value. As to other parameters, timely values may be predetermined. The initial values of the target parameter pt for both of the images IP and Ig, the initial value of the external parameter pep for the probe image IP, and the initial value of the external parameter peg for the gallery image Ig are outputted to the model image generation means 2102.

The model image generation means 2102 uses the target parameter pt and the external parameters pep and peg outputted as the initial values from the initial value estimation means 2101 for the first-time generation of a model image and uses the target parameter pt and the external parameters pep and peg updated by the parameter estimation means 2104 for subsequent repeated generations.

With use of the image variation model 1204, the model image generation means 2102 generates as a model image an image under the conditions represented by those parameters $\{pt, pep, peg\}$. When there are a plurality of parameters, each of $\{pt, pep, peg\}$ is a vector.

In a case where the model described in the aforementioned Prior Art Reference 2 is used as the image variation model 1204, 3D data of a specific person's face are computed by computing a linear combination of basic 3D data and basic texture data while using the parameter representing an individuality as a coupling coefficient. Next, a model image is generated from the parameters for a pose, illumination, and camera characteristics by using computer graphics technology.

In a case where the model described in the aforementioned Prior Art Reference 1 is used as the image variation model 1204, the model image generation means 2102 selects corresponding 3D shape data and basic texture group based on the parameter representing an individuality. Then the model image generation means 2102 computes a linear combination of the basic texture group while the illumination parameter is used as a coupling coefficient, thereby computing a luminance value of a 3D data surface under the illumination conditions. Next, the correlation between each point on the 3D data surface and a position of each pixel in the image is computed from the parameters for a pose, camera characteristics, or the like by using computer graphics technology. A model image is generated by setting a luminance value of the corresponding 3D data surface as a luminance value of a pixel.

A probe model image I'p and a gallery model image I'g are generated by performing the above processes on each of the probe image Ip and the gallery image Ig. In this case, it is assumed that the target parameter pt has the same value for and is a common parameter to those images in the generation process of each model image. Because the external parameter pe may have different values for those images, different parameters are used for the external parameter.

For example, in a personal identification system for identifying a person by using a facial image, a parameter representing a facial shape or an individuality of a texture is used as the target parameter pt, and a parameter describing a pose of a face, illumination conditions, camera characteristics, and the like is used as the external parameter pe. Furthermore, for example, in a system for recognizing a direction of an object, a parameter representing a pose of an object is used as the target parameter pt, and a parameter representing a kind or shape of an object, a surface color, illumination conditions, characteristics of a camera, and the like is used as the external parameter pe.

The probe model image I'p and the gallery model image I'g are given by the following formulas:

$$I'p = M(pt, pep)$$

$$I'g = M(pt, peg) \quad (1)$$

where the external parameter for the probe image is denoted by pep, the external parameter for the gallery image is denoted by peg, and the image generation by the aforementioned image variation model is denoted by the function M(pt, pe).

The cost evaluation means 2103 compares the probe model image I'p with the probe image Ip and compares the gallery model image I'g with the gallery image Ig to compute a cost function for model fitting. As shown as an example by the following formulas, the cost function may be the sum of square errors of luminance values of both images to be compared.

$$C = |I - I'|2$$

$$I = [IpT, wgIgT]T$$

$$I' = [I'pT, wgI'gT]T \quad (2)$$

In the formula 2, Ip is a vector including luminance values of respective pixels in the probe image as its components, Ig is a vector including luminance values of respective pixels in the gallery image as its components, I'p is a vector including luminance values of respective pixels in the probe model image as its components, I'g is a vector including luminance values of respective pixels in the gallery image as its components, an image vector I is a vector including Ip and wgIg as its components, and an model image vector I' is a vector including I'p and wgI'g as its components. The value of wg may be predetermined to be a suitable value. For example, a value obtained by dividing the number of pixels in the probe image by the number of pixels in the gallery image may be used as wg.

In another example, as in the technique of the aforementioned Prior Art Reference 2, a cost term representing a priori probability of a value of each parameter may be added to the value of the cost function shown by the formula 2.

The parameter estimation means 2104 updates the value of each of the target parameter pt and the external parameters pep and peg so as to improve the cost function value shown by the formula 2 (e.g., to decrease the value in the case of the formula 2). Various optimization methods can be used for this purpose. One example of those methods is a steepest-descent method.

The entire parameter vector including the respective parameters (pt, pep, peg) as its components is defined as p, and the value of each element pi is varied by a predetermined minute change $\Delta i$. Thus, a model image $I'(p+\Delta i)$ in which each component is varied by the minute change is generated by the model image generation means 2102. ($\Delta i$ is a vector in which a component i is $\Delta i$ while other components are zero.) Next, the cost evaluation means 2103 computes the value of the cost function $C(p+\Delta i)$ in accordance with the following formula.

$$C(p+\Delta i) = |I - I'(p+\Delta i)|2 \quad (3)$$

Next, a difference between the cost function value after the variation and the original cost function value is divided by the above-mentioned minute change to thereby compute a gradient vector $\nabla C$ of the cost function in accordance with the following formula.

$$\nabla C = [(C(p+\Delta 1) - C(p))/\Delta 1, (C(p+\Delta 2) - C(p))/\Delta 2, \ldots ]T \quad (4)$$

The value of the parameter p is updated by a steepest-descent method in accordance with the following formula.

$$p(t+1) = p(t) - \alpha \nabla C \quad (5)$$

Here, $\alpha$ is a predetermined gain constant. For example, the value of $\alpha$ may be 1.0. The value of $\alpha$ may be changed adaptively according to conditions.

The above method has been described merely by way of example. Various other optimization methods such as a Gauss-Newton method may be used. In an example using a Gauss-Newton method, a Jacobian matrix J can be computed by the following formula.

$$J = [(I - I'(p+\Delta 1))/\Delta 1, (I - I'(p+\Delta 2))/\Delta 2, \ldots ] \quad (6)$$

The parameter p is updated in accordance with the following formula.

$$p(t+1) = p(t) - \alpha (JTJ) - 1 J(I - I'(p)) \quad (7)$$

Instead of this method, various optimization methods can be applied to compute values of parameters that minimize the value of the cost function C.

In the case where the aforementioned Model 2 is used as the image variation model 1204, the parameter representing an individuality is a person's number and does not have a continuous value. In such a case, instead of the computation of the differential value, the processes in the model image generation means 2102 and the cost evaluation means 2103 may be repeated for each of possible values (i.e., for each person's face) to compute a value of the cost function. The value that produces the optimum cost value can be used as an estimate value. In this case, as to other parameters that may have a continuous value, parameters that minimize the value of the cost function can be computed by applying the aforementioned methods or various optimization methods.

Referring back to FIGS. 2 and 3, the model goodness-of-fit evaluation means 1202 evaluates whether or not the parameter estimation has been properly performed by the model fitting means 1201. Specifically, the model fitting process is performed on the assumption that the target parameter pt has the same value for the gallery image and the probe image. The model goodness-of-fit evaluation means 1202 computes a model goodness of fit, which is a criterion for determining whether or not this assumption conforms to the facts.

The model goodness-of-fit evaluation means 1202 in the present embodiment computes an error between the gallery model image I'g generated by the 2D model fitting means 1201 and the gallery image Ig and also an error between the probe model image I'p and the probe image Ip, sums those errors up, and outputs the summed value as a model goodness of fit V. Various image feature values may be used for the errors. For example, it is possible to use the sum of square errors of luminance values of the images as shown by the following formula.

$$V = vp|Ip - I'p|2 + vg|Ig - I'g|2 \quad (8)$$

In the formula 8, vp and vg are coefficients for adjusting weights to the probe image and the gallery image, respectively, and are predetermined to have suitable values. For example, vp=1 and vg=wg. Those values may be reciprocals of the numbers of pixels in the respective images, or may be varied adaptively according to conditions. Since the model goodness of fit V represents errors, it is noted that a smaller value of V means a better model.

Furthermore, in a system for collating a probe image with a plurality of gallery images, when the accuracy of the model fitting greatly varies (the difference between the gallery image and the gallery model image varies) depending on the gallery images, the recognition performance can be improved by decreasing vg. For example, a variance of errors between the gallery images and the gallery model images (|Ig-Ig'|2) and a variance of errors between the probe image and the probe model image (|Ip-Ip'|2), which are results of performing the process in the model fitting means 1201 on each combination of the probe image and each gallery image, are computed. The reciprocals of those variances are set to be values of vg and vp, respectively.

The above-mentioned computation method of a model goodness of fit V has been described merely by way of example. Various image feature values can be used. For example, an edge image may be generated, and its luminance error may be used. Alternatively, a normalized correlation value of luminance values may be used. In other words, the sum of an error in a certain image feature value between the probe model image and the probe image and an error in the certain image feature value between the gallery model image and the gallery image can be used as a model goodness of fit V.

The collation means 1203 performs a collation judgment between the gallery image Ig and the probe image Ip by using the model goodness of fit V computed by the model goodness-of-fit evaluation means 1202. In an example where a collation judgment is performed on one gallery image Ig, a threshold value is preset, and if a model goodness of fit V is better than the threshold value (smaller than the threshold value in the case of the formula 8), then it is judged that the target parameter pt for the probe image Ip is the same as the target parameter pt for the gallery image Ig.

Meanwhile, in a case where the probe image Ip is collated with plural sets of gallery images Ig, a model goodness of fit V is computed by performing the processes in the 2D model fitting means 1201 and the model goodness-of-fit evaluation means 1202 on a combination of each gallery image Ig and the probe image Ip. The target parameter pt for a gallery image Ig having the best model goodness of fit V (the smallest value if using the formula 8) is judged to be the closest value to the target parameter pt for the probe image.

A personal identification system using a facial image will be described as an example. A probe image is collated with three gallery images that were obtained by photographing three persons A, B, and C. If the gallery image of the person B has the best model goodness of fit, then a person photographed in the probe image is recognized as the person B. At that time, even if the three gallery images have different external parameters such as a direction of a face or illumination conditions, the external parameters do not affect the model goodness of fit. Accordingly, personal identification can correctly be performed.

A system for recognizing a pose of an object will be described as another example. For example, a probe image is collated with 19 gallery images that were obtained by photographing an object at intervals of 10 degrees from 90 degrees leftward through the front to 90 degrees rightward. If a gallery image at 70 degrees rightward has the best model goodness of fit, then a direction of the object in the probe image is recognized as 70 degrees rightward. At that time, even if the 19 gallery images have different external parameters such as illumination conditions or characteristics of the camera, the external parameters do not affect the model goodness of fit. Accordingly, the pose of the object can correctly be recognized.

Next, the effects of the present embodiment will be described.

In the present embodiment, both images of a probe image Ip and a gallery image Ig are inputted. A model fitting process is performed on the assumption that the target parameter pt to be collated has the same value for both images Ip and Ig. A model goodness of fit V, which is a criterion for the accuracy of the model fitting process, is computed, and the collation is performed with this model goodness of fit V. Thus, for the following reasons, the probe image can be collated with the gallery image without being greatly affected by an absolute accuracy of the model fitting process.

If the target parameter pt to be collated has different values for both images Ip and Ig, then model images I'p and I'g that are similar to the images Ip and Ig cannot be obtained. Therefore, a model goodness of fit V is extremely worsened. On the other hand, if the target parameter pt to be collated has the same value for both images Ip and Ig, then model images I'p and I'g that are similar to the images Ip and Ig can always be obtained in principle. Therefore, a model goodness of fit V has a good value. As a result, a significant difference is produced in the values of the model goodness of fit V between the case where the target parameter pt to be collated has the same value for both images Ip and Ig and the case where the target parameter pt to be collated has different values for the images Ip and Ig. In the collation judgment with one gallery image Ig, a threshold value is set at an intermediate value of that difference. Even if a value of the model goodness of fit V changes to some extent due to some decrease of the accuracy of the fitting process, it is possible to clearly distinguish between a gallery image having the same target parameter pt as that of the probe image and a gallery image not having the same target parameter, without being affected by the changes of the model goodness of fit V because of a large difference from the threshold value. Furthermore, in a collation judgment with plural sets of gallery images Ig, a model goodness of fit V computed for a combination of a gallery image Ig having the same target parameter pt as that of the probe image and the probe image Ip has a better value over model goodnesses of fit V computed for other combinations. Therefore, even if the value of the model goodness of fit V changes to some extent due to some decrease of the accuracy of the fitting process, it is possible to specify a gallery image having a target parameter pt that matches best with that of the probe image, without being affected by the changes of the model goodness of fit V.

By contrast, in the prior art, independent fitting processes are performed to estimate a target parameter ptp and an external parameter pep from a probe image Ip and to estimate a target parameter ptg and an external parameter peg from a gallery image Ig. Then a similarity between ptp and ptg is computed. Accordingly, as to a similarity between ptp and ptg, a difference between a case where the target parameters ptp and ptg to be collated have the same value for both images Ip and Ig and a case where the target parameters ptp and ptg to be collated have different values for both images Ip and Ig is less significant as compared to the difference of the values of the model goodness of fit V in the present embodiment. Thus, the prior art system is greatly affected by an absolute accuracy of the fitting process.

The above description refers to the case in which the probe image includes one image. However, the above description is similarly applicable to cases where a plurality of images are to be recognized. Furthermore, the above description is also applicable to cases in which a gallery image includes plural sets of images.

(Second Embodiment)

Next, a second embodiment of the present invention will be described below. While images are collated with each other in the aforementioned first embodiment, three-dimensional data are collated with each other in the present embodiment.

Figure 5:
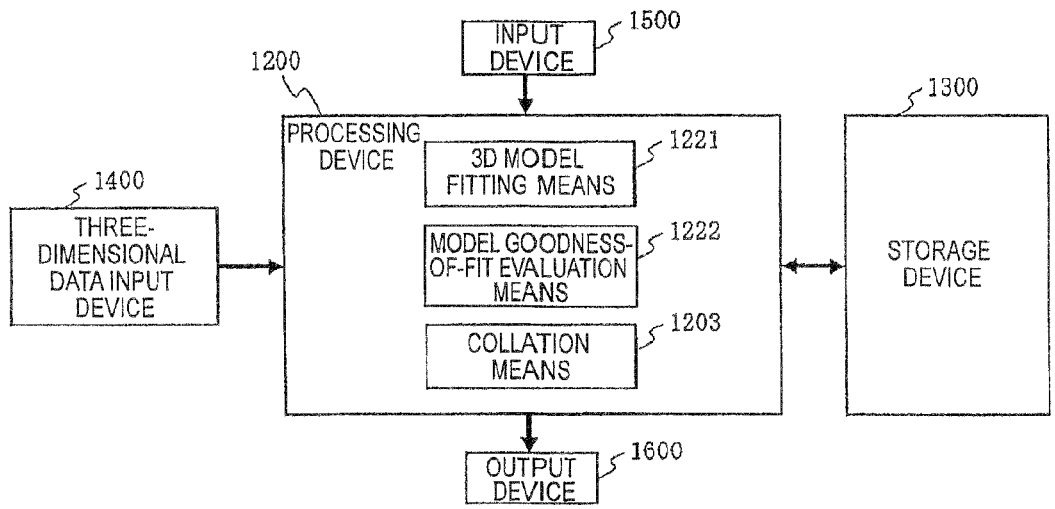
FIG. 5 is a block diagram of a second embodiment of the present invention.

Compared with the first embodiment shown in FIG. 2, the present embodiment shown in FIG. 5 differs in that it has a three-dimensional data input device 1400 instead of the image input device 1100 and that the processing device 1200 has a 3D model fitting means 1221 and a model goodness-of-fit evaluation means 1222 instead of the 2D model fitting means 1201 and the model goodness-of-fit evaluation means 1202.

The three-dimensional data input device 1400 is a device for inputting probe data of three-dimensional data to the processing device 1200 and may be a three-dimensional shape measurement device or other devices for reading probe data from a storage device, which is not shown in the drawings, or for receiving probe data via a network.

The storage device 1300 stores programs executed by the processing device 1200 and various types of data used for collation. The various types of data include gallery data and data relating to a three-dimensional data variation model. The gallery data may be prestored in the storage device 1300 or read together with probe data each time they are needed.

The three-dimensional data variation model is a model that describes how three-dimensional data to be measured vary according to diverse variable elements such as a kind of an object, and a state and a pose of the object. When parameters for diverse variable elements are provided to the three-dimensional data variation model, 3D data under those conditions can be generated. A group of data required for this process is stored in the storage device 1300.

One example of the 3D data variation model may use a model with which 3D shape data of various persons are collected in advance, and when a parameter specifying a person is given, 3D data of the specified person are outputted (referred to as Model 3). Furthermore, when a parameter of a pose is given, 3D data of the specified pose can be generated by multiplying a three-dimensional coordinate of the 3D data by a rotation matrix so as to rotate it to the specified pose.

Another example of the 3D data variation model is a 3D data variation model, as described in the aforementioned Prior Art Reference 2, capable of computing 3D data of various persons' faces when parameters representing an individuality of a 3D shape, an individuality of a texture, a facial expression, an age, and the like are provided (Model 4). With this model, 3D data of faces of a large number of persons are collected in advance. Some process steps are executed to perform principal component analysis on the data of shapes and textures, to compute a basic 3D data group and a basic texture group, and store them.

Furthermore, when a parameter of a pose is given, model 3D data of the specified pose can be generated by multiplying a three-dimensional coordinate of the computed 3D data by a rotation matrix to rotate it so as to the specified pose.

In this model, a three-dimensional coordinate S'(i) of a point i of shape data S' in the model 3D data and texture data T' are given by the following formulas.

$$S'^{(i)} = R(r_x, r_y, r_z)\left(S_0^{(i)} + \sum_{j=1}^{100} a_j S_j^{(i)} + \sum_{j=1}^{10} c_j S_{100+j}^{(i)}\right) + t \qquad (9)$$

$$T' = T_0 + \sum_{i=1}^{100} b_j T_j + \sum_{i=1}^{10} c_j T_{100+j}$$

where reference 3D shape data are denoted by S0, reference texture data are denoted by T0, 100 parameters representing individualities of the 3D shapes are denoted by a1, . . . , a100, basic shape data corresponding to the respective parameters are denoted by S1, . . . , S100, 10 parameters representing changes of facial expression are denoted by c1, . . . , c10, basic shape data representing deformation by the facial expression changes are denoted by S101, . . . , S110, 100 parameters representing individualities of the textures are denoted by b1, . . . , b100, basic texture data corresponding to the respective parameter are denoted by T1, . . . , T100, basic texture data representing changes of the textures due to the facial expression changes are denoted by T101, . . . , T110, rotational angles about x, y, and z axes of the parameter representing a pose are denoted by rx, ry, rz, and parallel translations are denoted by tx, ty, tz.

Here, R is a rotation matrix, and t=[tx, ty, tz]. Data of S0, S1, . . . , S110, T0, T1, . . . , T110 are stored in the storage means 1300. The definitions that the number of the parameters for the individualities is 100 and that the number of the parameters for the facial expression changes is 10 have been described merely by way of example. Those configurations may be changed in various ways.

The above 3D data variation model has been described merely by way of example. Thus, various other 3D data variation models may be used instead.

Figure 6:
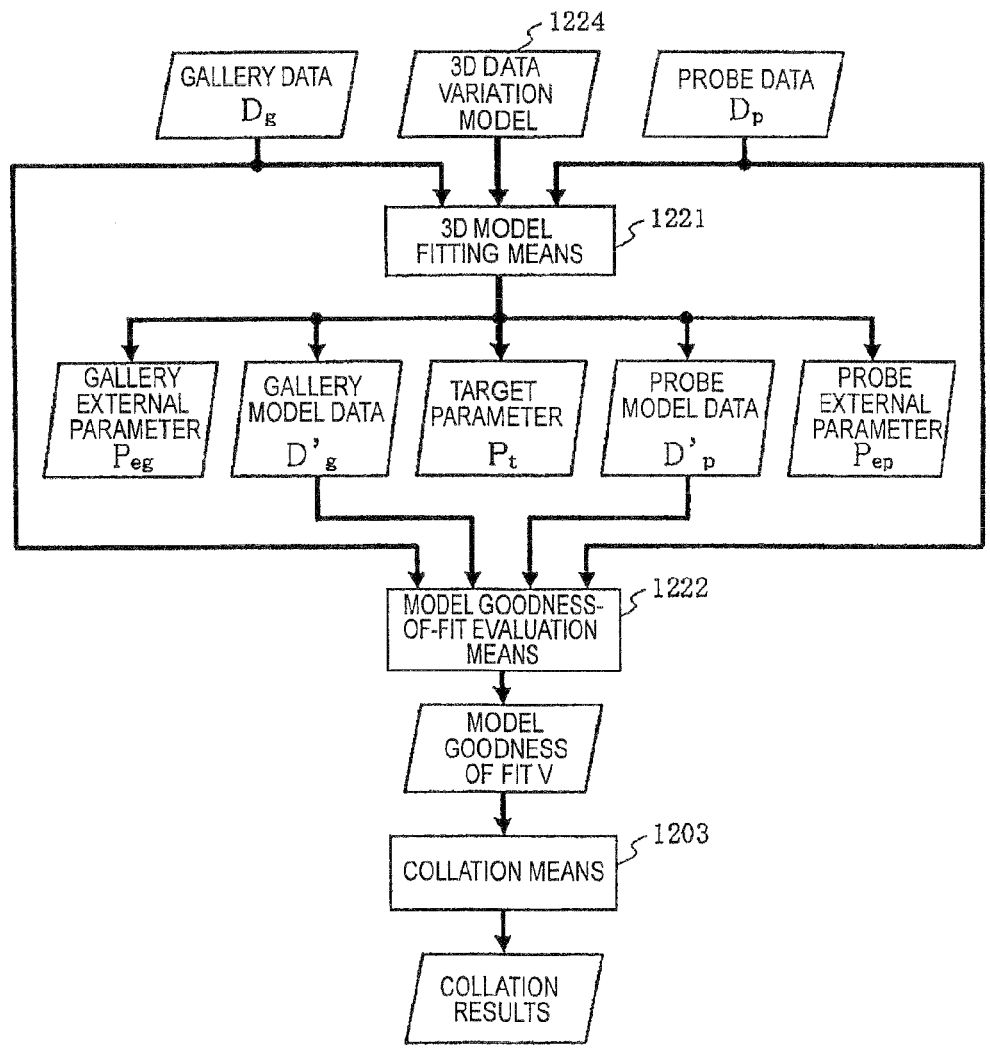
FIG. 6 is a diagram showing a flow of a process in the second embodiment of the present invention.

Referring to FIG. 6, the 3D model fitting means 1221 receives inputs of both 3D data of gallery data Dg and probe data Dp. Assuming that a target parameter pt representing an element to be recognized has the same value for both data and that a parameter pe representing other variable elements may have different values for the respective data, the 3D model fitting means 1221 computes values of those parameters pt and pe by using a 3D data variation model 1224 as described above so as to generate model data D'g and D'p that are closest to the 3D data Dg and Dp (model data in which the following cost function has a small value). In other words, the 3D model fitting means 1221 do not estimate parameters independently for the probe data Dp and the gallery data Dg and compare the estimation results of the target parameters, but simultaneously estimates the target parameter pt and the external parameter pe for both data on the assumption that the target parameter pt has the same value for both data.

For example, in a personal identification system for recognizing a person by inputting facial 3D data, the target parameter pt is a parameter representing an individuality (a1, . . . , a100 and b1, . . . , b100 as described above), and the external parameter pe is a parameter relating to a facial expression and a pose of a face (c1, . . . , c10, rx, ry, rz, tx, ty, and tz as described above).

For example, in a position pose estimation system for estimating a position or a pose of an object, the target parameter pt is a pose parameter (rx, ry, rz, tx, ty, and tz as described above), and the external parameter pe is a parameter relating to a kind and a state of the object (a1, . . . , a100, b1, . . . , b100, and c1, . . . , c100 as described above) and characteristics of a three-dimensional shape measurement device.

If only a specified object is to be recognized, the parameter for a kind of an object may be dispensed with. Furthermore, if the same measurement device is used, the parameter for characteristics of the device may be dispensed with. Thus, a parameter may be set for any element as desired, and a 3D data variation model that describes deformation of 3D data by the element can be prepared.

Figure 7:
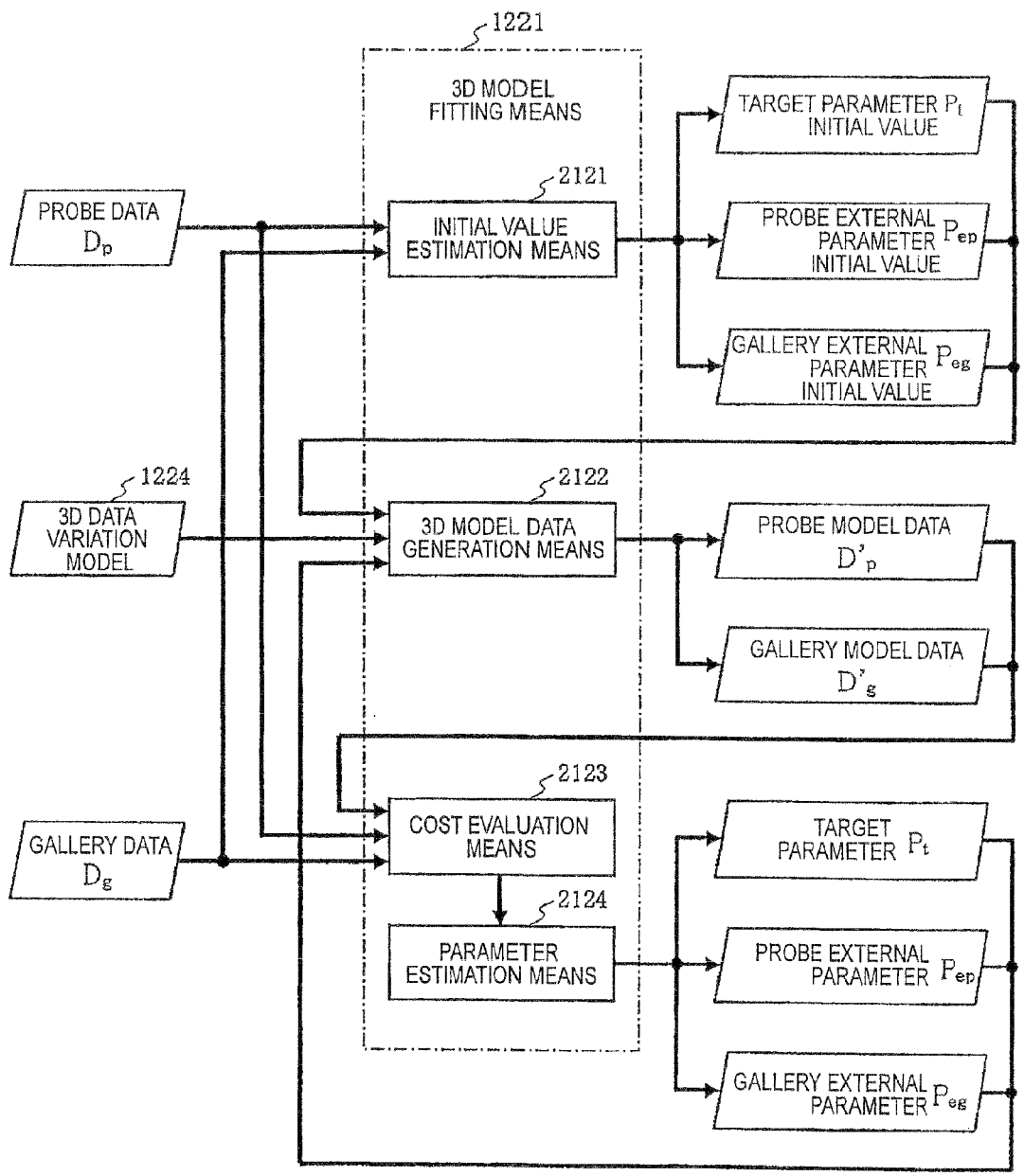
FIG. 7 is a diagram showing a configuration of a 3D model fitting means and its process in the second embodiment of the present invention.

Referring to FIG. 7, the 3D model fitting means 1221 has an initial value estimation means 2121, a 3D model data generation means 2122, a cost evaluation means 2123, and a parameter estimation means 2124.

The initial value estimation means 2121 computes initial values of the parameters Pt, Pep, and Peg for 3D data variable elements of the probe data Dp and the gallery data Dg. Those values may be predetermined known values or values measured by a separate sensor or the like, or may be inputted as information added to the images IP and Ig, or may be inputted as information added to the 3D data.

For example, in a face recognition system, when reference-point position data representing positions of eyes, a nose, and a mouth in a face within 3D data are set as additional information, estimate values for a position and a pose of a face (rx, ry, rz, tx, ty, and tz as described above) and a shape of a face (a1, . . . , a100 as described above) can be computed as initial values from the information. As to a parameter for an individuality of a 3D shape or a texture, a parameter for a facial expression, or the like, mean values of data for a large number of persons (e.g., a1~a100=0, b1~b100=0, c1~c10=0) may be used as the initial values. Alternatively, values for a specified person may be used as the initial values. As to other parameters, suitable values may be predetermined. The initial values of the target parameter Pt for both 3D data of the probe data Dp and the gallery data Dg, the initial value of the external parameter Pep for the probe data Dp, and the initial value of the external parameter Peg for the gallery data Dg are outputted to the 3D model data generation means 2122.

The 3D model data generation means 2122 uses the target parameter pt and the external parameters Pep and Peg outputted as the initial values from the initial value estimation means 2121 for the first-time generation of model data and uses the target parameter pt and the external parameters pep and peg updated by the parameter estimation means 2124 for subsequent repeated generations. For each generation, with use of the 3D data variation model 1224, the 3D model data generation means 2122 generates and outputs probe model data D'p and gallery model data D'g under the conditions represented by the parameters Pt, Pep, and Peg.

In the case where the aforementioned Model 3 is used as the 3D data variation model 1224, the parameter representing an individuality is a person's number or the like. Model 3D data can be generated by reading 3D data of a corresponding person. Furthermore, in the case where a pose parameter is used, model 3D data of the pose can be generated by applying a rotation matrix. Moreover, model 3D data to which a facial expression change is added can be generated by modifying 3D data with adding a model of changes caused by facial expression and parameters describing the model of changes.

In the case where the aforementioned Model 4 is used as the 3D data variation model, 3D data of a specified person's face are computed by computing a linear combination of each of basic 3D data and basic texture data while using the parameter representing an individuality, an age, a shape of a body, or the like as a coupling coefficient. Then, with use of the parameter of a pose, model 3D data of the pose are generated by applying a rotation matrix to the computed 3D data.

In the example of the aforementioned Model 4, the shape data S' and the texture data T' of the model 3D data are computed by the formula 9. Both data are collectively referred to as model data D'. The configuration of the parameters has been described merely by way of example. Model 3D data may be generated by further modifying the 3D data with adding parameters such as changes caused by facial expression.

Probe model data D'p and gallery model data D'g are generated by performing the above processes with use of variable parameters for each of the probe data Dp and the gallery data Dg. In the generation process of each model data, the target parameter pt has the same value, and the external parameters pep and peg have different values. In the aforementioned example of the personal identification system, pt=[a1, ..., a100, b1, ..., b100] and pe=[c1, ... c10, rx, ry, rz, tx, ty, tz]. The model data D'p and D'g for the probe data Dp and the gallery data Dg are given by the following formulas:

$$D'p = N(pt, pep)$$

$$D'g = N(pt, peg) \quad (10)$$

where the value of the external parameter for the probe data is denoted by pep, the value of the external parameter for the gallery data is denoted by peg, and the generation processes of the 3D shape data and the texture data with the aforementioned formula 9 using the 3D data variation model are collectively represented by a function N(pt, pe).

The cost evaluation means 2123 compares the probe and gallery data Dp and Dg with the generated model data D'p and D'g, respectively, to compute a cost function for fitting. As shown as an example by the following formula, the cost function may be the weighted sum of square errors of three-dimensional coordinates and luminance values of both data to be compared.

$$C = |Sp-Sp'|2 + wt|Tp-Tp'|2 + wg(|Sg-Sg'|2 + wt|Tg-Tg'|2) \quad (11)$$

Here, Sp and Tp are 3D shape and texture data of the probe data Dp, respectively, S'p and T'p are 3D shape and texture data of the probe model data D'p, Sg and Tg are 3D shape and texture data of the gallery data Dg, and S'g and T'g are 3D shape and texture data of the gallery model data D'g. Furthermore, wt is a coefficient for adjusting a weight of a three-dimensional coordinate and a texture, and wg is a coefficient for adjusting a weight of the probe and the gallery. Suitable values are predetermined for those coefficients. An example of a value of wt may be a value of (|Sp−Sp'|2/|Tp−Tp'|2) when C is first computed. An example of a value of wg may be a value of ((|Sp−Sp'|2+wt|Tp−Tp'|2)/(|Sg−Sg'|2+wt|Tg−Tg'|2)) when C is first computed. Furthermore, those values may be updated in the repeated processes.

The cost function shown herein has been described merely by way of example. Instead of this example, various cost functions can be used. For example, a cost term representing a priori probability of each parameter may be added to the value of the cost function.

For example, if it is known that the values of pt, pep, and peg respectively become close to the values of pt0, pep0, and peg0, then the following cost function can be used.

$$C = |Sp-Sp'|2 + wt|Tp-Tp'|2 + wg(|Sg-Sg'|2 + wt|Tg-Tg'|2) + wpt(pt-pt0)2 + wpep(pep-pep0)2 + wpeg(peg-peg0)2 \quad (12)$$

Here, suitable values are predetermined for wpt, wpep, and wpeg.

The parameter estimation means 2124 updates the value of each of the target parameter pt and the external parameters pep and peg so as to improve the value of the cost function. Various optimization methods can be used for this purpose. One example of those methods is a steepest-descent method.

The entire parameter vector including the respective parameters (pt, pep, peg) as its components is defined as p, and the value of each element pi is varied by a predetermined minute change Δi. Thus, shape data Sp'(p+Δi) and texture data Tp'(p+Δi) of the probe model data D'p(p+Δi) and shape data Sg'(p+Δi) and texture data Tg'(p+Δi) of the gallery model data D'g(p+Δi) in which each component is varied by the minute change are generated by the model data generation means 2122. (Δi is a vector in which a component i is Δi while other components are zero.) Next, the cost evaluation means 2123 computes the value of the cost function C(p+Δi) in accordance with the following formula.

$$C(p+\Delta i) = |Sp-Sp'(p+\Delta i)|2 + wt|Tp-Tp'(p+\Delta i)|2 + wg(|Sg-Sg'(p+\Delta i)|2 + wt|Tg-Tg'(p+\Delta i)|2) \quad (13)$$

Next, a difference between the cost function value after the variation and the original cost function value is divided by the above-mentioned minute change to thereby compute a gradient vector ∇C of the cost function as shown by the following formula.

$$\nabla C = [(C(p+\Delta 1) - C(p))/\Delta 1, (C(p+\Delta 2) - C(p))/\Delta 2, \ldots ]T \quad (14)$$

The value of the parameter p is updated by a steepest-descent method in accordance with the following formula.

$$p(t+1) = p(t) - \alpha \nabla C \quad (15)$$

Here, α is a predetermined gain constant. For example, the value of α may be 1.0. The value of α may be changed adaptively according to conditions.

The above method has been described merely by way of example. As with the first embodiment, various other optimization methods such as a Gauss-Newton method can be used to compute values of parameters that minimize the value of the cost function C.

In the case where the aforementioned Model 3 is used as the 3D data variation model, the parameter representing an individuality is a person's number and does not have a continuous value. In such a case, instead of the computation of the differential value, the processes in the 3D model data generation means 2122 and the cost evaluation means 2123 are repeated for each of possible values (i.e., for individual 3D data of each person) to compute a value of the cost function. Thus, the value that produces the optimum cost value can be used as an estimate value. In this case, as to other parameters that can have a continuous value, parameters that minimize the value of the cost function can be computed by applying the aforementioned methods or various optimization methods.

Referring back to FIGS. 5 and 6, the model goodness-of-fit evaluation means 1222 evaluates the accuracy of the model fitting process in the 3D model fitting means 1221. Specifically, the model fitting process is performed on the assumption that the target parameter pt has the same value. The model goodness-of-fit evaluation means 1222 performs a process of computing a model goodness of fit V, which shows whether or not the 3D data variation model 1224 conforms to the probe data Dp and the gallery data Dg on that assumption.

In the present embodiment, the model goodness-of-fit evaluation means 1222 computes an error between the gallery model data D'g generated by the 3D model fitting means 1221 and the gallery data Dg and also an error between the probe model data D'p and the probe data Dp, sums those errors up, and outputs the summed value as a model goodness of fit V. Various feature values may be used to calculate those errors. For example, it is possible to use the weighted sum of square errors of three-dimensional coordinates and texture luminance values as shown by the following formula.

$$V = vp(|Sp-Sp'|^2 + vt|Tp-Tp'|^2) + vg(|Sg-Sg'|^2 + vt|Tg-Tg'|^2) \quad (16)$$

Here, vt, vp, and vg are weight coefficients and are predetermined to have suitable values. For example, vp=1, vg=wg, and vt=wt. Although errors of three-dimensional coordinates and texture luminance values are used in this example, errors of normal vectors or errors of feature values such as edges of textures may be used instead. Since the model goodness of fit V represents errors, it is noted that a smaller value of V suggests a better model.

In a system for collating a probe data DP with plural pieces of gallery data Dg, when the accuracy of the model fitting greatly varies (the difference between the gallery data Dg and the gallery model data D'g varies) depending on the gallery data Dg, the recognition performance can be improved by decreasing vg. For example, a variance of errors between the gallery data Dg and the gallery model data D'g ($|Sg-Sg'|^2 + vt|Tg-Tg'|^2$) and a variance of errors between the probe data Dp and the probe model data D'p ($|Sp-Sp'|^2 + vt|Tp-Tp'|^2$), which are results of performing the process in the 3D model fitting means 1221 on each combination of the probe data DP and each piece of the gallery data Dg, are computed. The reciprocals of the resultant variances can be set to be values of vp and vg, respectively.

The above-mentioned computation method of a model goodness of fit V has been described merely by way of example. The value of the cost function C shown in the formula 11 may be used. It is possible to various computation methods including a method of computing normal vectors of three-dimensional shape surfaces instead of three-dimensional coordinates and using an error of those normal vectors, a method of using a normalized correlation value of three-dimensional coordinates, and a method of using a feature value such as an edge of a texture.

The collation means 1203 is the same as that in the first embodiment. The collation means 1203 performs a collation judgment between the gallery data Dg and the probe data Dp by using the value of the model goodness of fit V computed by the model goodness-of-fit evaluation means 1222. In an example where a collation judgment is performed on one piece of gallery data D'p, a threshold value is preset, and if the model goodness of fit V is better than the threshold value (smaller than the threshold value in the case of the formula 16), then the target parameter pt for the probe data Dp is recognized to be the same as the target parameter pt for the gallery data Dg.

When there are plural pieces of gallery data Dg, a model goodness of fit V is computed by performing the processes in the 3D model fitting means 1221 and the model goodness-of-fit evaluation means 1222 on a combination of each piece of gallery data Dg and the probe data Dp. The target parameter pt for gallery data Dg having the best model goodness of fit V (the smallest value if using the formula 8) is judged to be the closest value to the target parameter pt for the probe data Dp. Alternatively, the value of the target parameter pt for the probe data Dp may be estimated by interpolation using target parameters pt for plural pieces of gallery data Dg having a model goodness of fit better than a certain threshold value.

A personal identification system using facial 3D data will be described as an example. For example, probe data are collated with three pieces of gallery data of three persons A, B, and C. If the gallery data of the person B have the best model goodness of fit, then the probe data are recognized as 3D data of the person B. At that time, even if the three pieces of gallery data have different external parameters such as a direction of a face, the external parameters do not affect the model goodness of fit. Accordingly, personal identification can correctly be performed.

A system for recognizing a pose of an object will be described as another example. For example, probe 3D data are collated with 19 pieces of gallery 3D data that were measured by placing an object at intervals of 10 degrees from 90 degrees leftward through the front to 90 degrees rightward. If a piece of gallery data at 70 degrees rightward has the best model goodness of fit, then a direction of the object when the probe data were measured is recognized as 70 degrees rightward.

In the above description, 3D data include both of 3D shape data and texture data. However, 3D data including only 3D shape data and not including texture data can also be processed in the same manner as described above.

Next, the effects of the present embodiment will be described.

In the present embodiment, both three-dimensional data of probe data Dp and gallery data Dg are inputted. A model fitting process is performed on the assumption that the target parameter pt to be collated has the same value for both data Dp and Dg. A model goodness of fit V, which is a criterion for the accuracy of the model fitting process, is computed, and the collation is performed with this model goodness of fit V. Thus, for the following reasons, the probe data can be collated with the gallery data without being greatly affected by an absolute accuracy of the model fitting process.

If the target parameter pt to be collated has different values for both data Dp and Dg, then model data D'p and D'g that are similar to the data Dp and Dg cannot be obtained. Therefore, a model goodness of fit V is extremely worsened. On the other hand, if the target parameter pt to be collated has the same value for both data Dp and Dg, then model data D'p and D'g that are similar to the data Dp and Dg can always be obtained in principle. Therefore, a model goodness of fit V has a good value. As a result, a significant difference is produced in the values of the model goodness of fit V between the case where the target parameter pt to be collated has the same value for both data Dp and Dg and the case where the target parameter pt to be collated has different values for the data Dp and Dg. In the collation judgment with one piece of gallery data Dg, a threshold value is set at an intermediate value of that difference. Even if a value of the model goodness of fit V changes to some extent due to some decrease of the accuracy of the fitting process, it is possible to clearly distinguish between gallery data having the same target parameter pt as that of the probe data and gallery data not having the same target parameter, without being affected by the changes of the model goodness of fit V because of a large difference from the threshold value. Furthermore, in a collation judgment with plural sets of gallery data Dg, a model goodness of fit V computed for a combination of gallery data Dg having the same target parameter pt as that of the probe data and the probe data Dp has a better value over model goodnesses of fit V computed for other combinations. Therefore, even if the value of the model goodness of fit V changes to some extent due to some decrease of the accuracy of the fitting process, it is possible to specify gallery data having a target parameter pt that matches best with that of the probe data, without being affected by the changes of the model goodness of fit V.

By contrast, in the prior art, independent fitting processes are performed to estimate a target parameter ptp and an external parameter pep from probe data Dp and to estimate a target parameter ptg and an external parameter peg from gallery data Dg. Then a similarity between ptp and ptg is computed.

Accordingly, as to a similarity between ptp and ptg, a difference between a case where the target parameters ptp and ptg to be collated have the same value for both data Dp and Dg and a case where the target parameters ptp and ptg to be collated have different values for both data Dp and Dg is less significant as compared to the difference of the values of the model goodness of fit V in the present embodiment. Thus, the prior art system is greatly affected by an absolute accuracy of the fitting process.

(Third Embodiment)

Next, a third embodiment of the present invention will be described below. While images are collated with each other in the aforementioned first embodiment, the collation apparatus in the present embodiment collates an inputted probe image with gallery data which are three-dimensional data.

Figure 8:
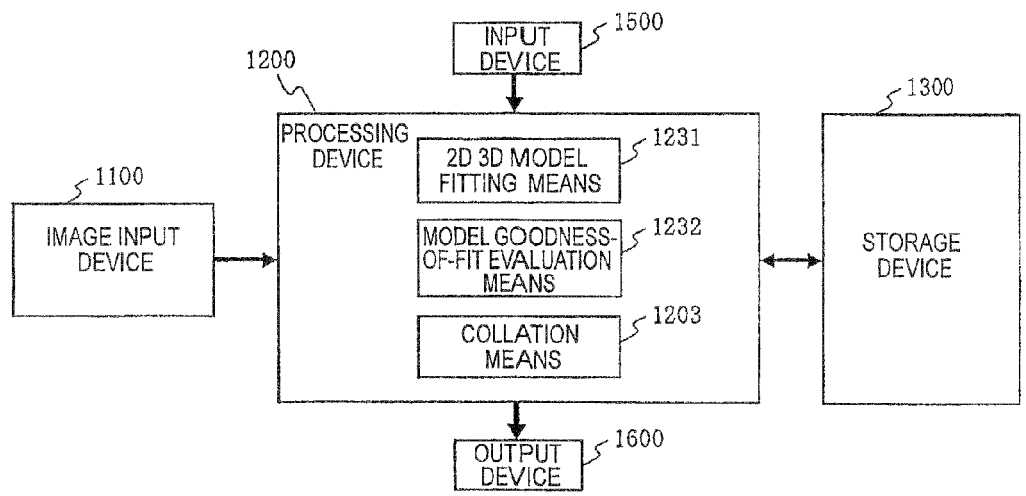
FIG. 8 is a block diagram of a third embodiment of the present invention.

Compared with the first embodiment shown in FIG. 2, the present embodiment shown in FIG. 8 differs in that the processing device 1200 has a 2D-3D model fitting means 1231 and a model goodness-of-fit evaluation means 1232 instead of the 2D model fitting means 1201 and the model goodness-of-fit evaluation means 1202.

The storage device 1300 stores programs executed by the processing device 1200 and various types of data used for collation. The various types of data include gallery data which are three-dimensional data and data relating to an image variation model and a three-dimensional data variation model. The gallery data may be prestored in the storage device 1300 or read together, with a probe image from a three-dimensional data input device, which is not shown in the drawings, each time they are needed.

The three-dimensional data variation model is a model that describes how 3D data to be measured vary according to diverse variable elements such as a kind of an object and a state and a pose of the object. When parameters for diverse variable elements are provided to the three-dimensional data variation model, 3D data under those conditions can be generated. A group of data required for this process is stored in the storage device 1300. Examples of the 3D data variation model include Model 3 and Model 4 described in the second embodiment. However, these are mere examples. Various other 3D data variation models can be used.

The image variation model is a model that uses parameters representing a direction or a position of a camera, illumination conditions, characteristics of the camera, and the like and generates an image under those conditions from the 3D data generated by the 3D data variation model. This image variation model can use a combination of various camera models (a pinhole camera, a parallel projection model, and the like) and illumination models (standard technology of computer graphics such as a perfectly diffusing model and a Phong model or technology using illumination bases described in Patent Document 1).

The aforementioned 3D data variation model and image variation model have been described merely by way of example. Various other image variation models can be used instead.

Figure 9:
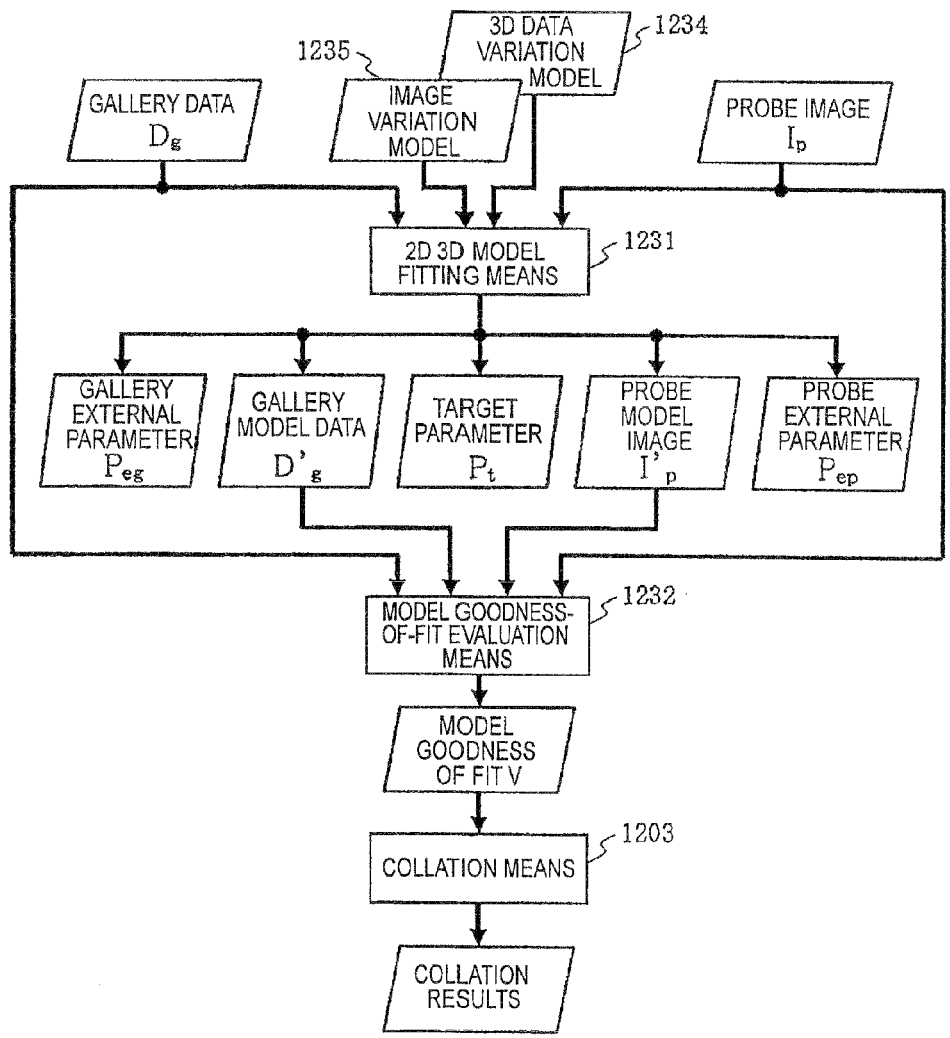
FIG. 9 is a diagram showing a flow of a process in the third embodiment of the present invention.

Referring to FIG. 9, the 2D-3D model fitting means 1231 receives inputs of a probe image Ip and gallery data Dg. Assuming that a target parameter pt representing a variable element to be recognized has the same value for both data Ip and Dg and that a parameter pe representing other variable elements may have different values for the data Ip and Dg the 2D-3D model fitting means 1231 computes values of those parameters pt and pe by using the aforementioned 3D data variation model 1234 so as to generate model data D'g that are closest to the gallery data Dg (model data in which the following cost function has a small value) and also by using the aforementioned image variation model 1235 so as to generate a model image I'p that is closest to the probe image Ip. Here, the external parameter for the probe image Ip is denoted by pep, and the external parameter for the gallery data Dg is denoted by peg.

For example, in a system for collating a facial image with facial 3D data to perform personal identification, the parameter pt is a parameter representing an individuality of a facial shape or a texture, the parameter pep is a parameter of a facial expression, illumination conditions, a position, a direction, and a focal distance of a camera, and the like, and the parameter peg is a parameter for a facial expression, a pose of a face, and the like. Furthermore, for example, in a system for collating a facial image with facial 3D data to recognize a pose of a face, the parameter pt is a parameter representing a pose of a face, the parameter pep is a parameter of an individuality, a facial expression, illumination conditions, a position, a direction, and a focal distance of a camera, and the like, and the parameter peg is a parameter of an individuality, a facial expression, and the like. These parameters described herein are mere examples. The number and types of the parameters can be modified in various manners depending upon models.

Figure 10:
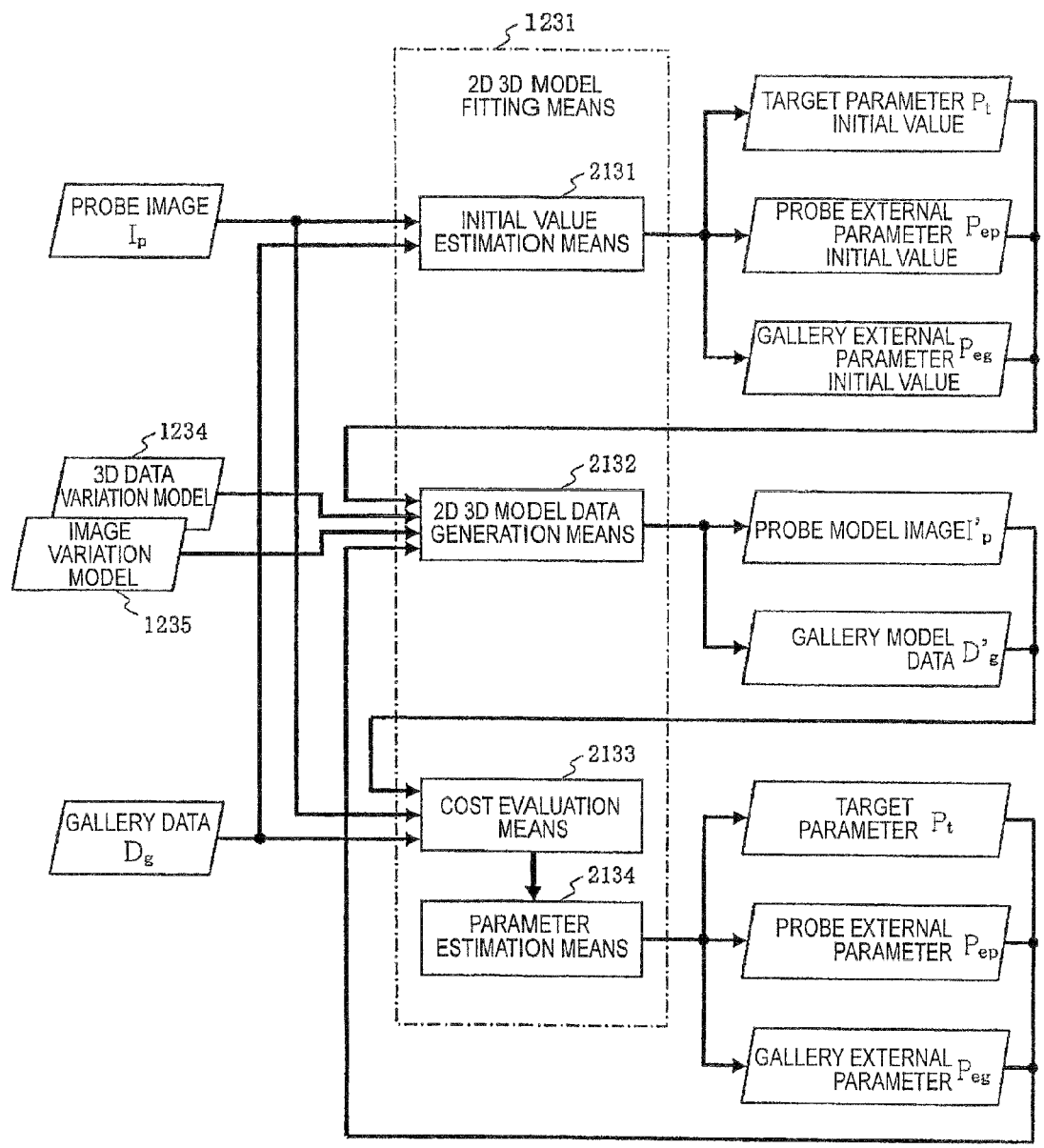
FIG. 10 is a diagram showing a configuration of a 2D-3D model fitting means and its process in the third embodiment of the present invention.

Referring to FIG. 10, the 2D-3D model fitting means 1231 has an initial value estimation means 2131, a 2D-3D model data generation means 2132, a cost evaluation means 2133, and a parameter estimation means 2134.

The initial value estimation means 2131 computes initial values of the parameters for the image variable elements of the probe image Ip and the parameters for the 3D data variable elements of the gallery data Dg. Those values may be predetermined known values or values measured by a separate sensor or the like, or may be inputted as information added to the probe image Ip and the gallery data Dg. The computation of the initial values for the probe image Ip can be performed in the same manner as with the initial value estimation means 2101 in the first embodiment, and the computation of the initial values for the gallery data Dg can be performed in the same manner as with the initial value estimation means 2121 in the second embodiment. The above-mentioned computation methods of the initial values are mere examples and can be modified in various manners.

The initial values of the target parameter pt for both data of the probe image Ip and the gallery data Dg, the initial value of the external parameter pep for the probe image Ip, and the initial value of the external parameter peg for the gallery data Dg are outputted to the 2D-3D model data generation means 2132.

The 2D-3D model data generation means 2132 uses the target parameter pt and the external parameters Pep and Peg outputted as the initial values from the initial value estimation means 2131 for the first-time generation of model data and uses the target parameter pt and the external parameters Pep and Peg updated by the parameter estimation means 2134 for subsequent repeated generations. With use of the 3D data variation model 1234 and the image variation model 1235, respectively, the 2D-3D model data generation means 2132 generates a probe model image I'p and gallery model data D'g under the conditions represented by those parameters Pt, Pep, and Peg.

The process of generating an image as a probe model image I'p under conditions represented by the current values of the target parameter pt and the external parameter pep with use of the image variation model 1235 can be performed in the identical manner to that in the model image generation means 2102 of the first embodiment. Furthermore, the process of generating 3D data as gallery model data D'g under conditions represented by the current values of the target parameter pt and the gallery external parameter peg with use of the 3D data variation model 1234 can be performed in the identical manner to that in the 3D model data generation means 2122 of the second embodiment. Those processes are represented by the following formulas.

$$I'p = M(pt, pep)$$

$$D'g = N(pt, peg) \quad (17)$$

The cost evaluation means 2133 compares the probe image Ip with the probe model image I'p and compares the gallery data Dg with the gallery model data D'g to compute a cost function for fitting. As shown as an example by the following formula, the cost function C may be the weighted sum of square errors of both data to be compared.

$$C = |Ip - I'p|2 + wg(|Sg - Sg'|2 + wt|Tg - Tg'|2) \quad (18)$$

Here, Sg and Tg are 3D shape and texture data of the gallery data, respectively, S'g and T'g are 3D shape and texture data of the gallery model data, and wt is a coefficient for adjusting a weight of a three-dimensional coordinate and a texture. Furthermore, wg is a coefficient for adjusting a weight of the image and the 3D data. Suitable values are predetermined for those coefficients.

Various methods can be used as a method of determining a value of wt. In an example of such methods, wt may be set to have a value of $(|Sg - Sg'|2 / |Tp - Tp'|2)$ when C is first computed.

Various methods can be used as a method of determining a value of wg. In an example of such methods, wg may be set to have a value of $((|Ip - I'p|2) / (|Sg - Sg'|2 + wt|Tg - Tg'|2))$ when C is first computed.

The cost function shown herein has been described merely by way of example. Instead of this example, various cost functions can be used. For example, a cost term representing a priori probability of each parameter may be added to the value of the cost function. For example, if it is known that the values of pt, pep, and peg respectively become close to the values of pt0, pep0, and peg0, then the following cost function can be used.

$$C = |Ip - I'p|2 + wg(|Sg - Sg'|2 + wt|Tg - Tg'|2) + wpt(pt - pt0)2 + wpep(pep - pep0)2 + wpeg(peg - peg0)2 \quad (19)$$

Here, suitable values are predetermined for wpt, wpep, and wpeg.

The parameter estimation means 2134 updates the value of each of the target parameter Pt and the external parameters Pep and Peg so as to improve the value of the cost function C. Various optimization methods can be used for this purpose. One example of those methods is a steepest-descent method.

The entire parameter vector including the respective parameters (pt, pep, peg) as its components is defined as p. Shape data $Sg'(p+\Delta i)$ and texture data $Tg'(p+\Delta i)$ of the probe model image $I'p(p+\Delta i)$ and the gallery model data $D'g(p+\Delta i)$ when the value of each element pi is varied by a predetermined minute change $\Delta i$ and when each components is varied by a minute change are generated by the model data generation means 2132. ($\Delta i$ is a vector in which a component i is $\Delta i$ while other components are zero.) Next, the cost evaluation means 2133 computes the value of the cost function $C(p+\Delta i)$ in accordance with the following formula.

$$C(p+\Delta i) = |Ip - Ip'(p+\Delta i)|2 + wg(|Sg - Sg'(p+\Delta i)|2 + wt|Tg - Tg'(p+\Delta i)|2) \quad (20)$$

Next, a difference between the cost function value after the variation and the original cost function value is divided by the above-mentioned minute change to thereby compute a gradient vector $\nabla C$ of the cost function as shown by the following formula.

$$\nabla C = [(C(p+\Delta 1) - C(p))/\Delta 1, (C(p+\Delta 2) - C(p))/\Delta 2, \ldots ]T \quad (21)$$

The value of the parameter p is updated by a steepest-descent method in accordance with the following formula.

$$p(t+1) = p(t) - \alpha \nabla C \quad (22)$$

Here, $\alpha$ is a predetermined gain constant. For example, the value of $\alpha$ may be 1.0. The value of $\alpha$ may be changed adaptively according to conditions.

The above method has been described merely by way of example As with the first embodiment, various other optimization methods such as a Gauss-Newton method can be used to compute values of parameters that minimize the value of the cost function C.

Referring back to FIGS. 8 and 9, the model goodness-of-fit evaluation means 1232 evaluates the accuracy of the model fitting process in the 2D-3D model fitting means 1231. Specifically, the model fitting process is performed on the assumption that the target parameter pt has the same value. The model goodness-of-fit evaluation means 1232 performs a process of computing a model goodness of fit V, which shows whether or not the image variation model 1235 and the 3D data variation model 1234 conform to the probe image Ip and the gallery data Dg on that assumption. The model goodness-of-fit evaluation means 1232 in the present embodiment receives inputs of the probe model image I'p, the probe image Ip, the gallery model data D'g, and the gallery data Dg. The model goodness-of-fit evaluation means 1232 sums their errors and outputs the summed value as a model goodness of fit V.

Various feature values may be used to calculate those errors. For example, it is possible to use the weighted sum of square errors of three-dimensional coordinates and texture luminance values as shown by the following formula.

$$V = vp|Ip-Ip'|2 + vg(|Sg-Sg'|2 + vt|Tg-Tg'|2) \quad (23)$$

Here, vt, vp, and vg are weight coefficients and are predetermined to have suitable values. For example, vp=1, vg=wg, and vt=wt. Although weighted errors of image luminance values, three-dimensional coordinates, and texture luminance values are used in this example, errors of normal vectors or errors of feature values such as edges of image and textures may be used instead. Furthermore, the value of the cost function C in the formula 18 or 20 may be used as a model goodness of fit V. Since the model goodness of fit V represents errors, it is noted that a smaller value of V means a better model.

The collation means 1203 is the same as that in the first embodiment. The collation means 1203 performs a collation judgment between the gallery data Dg and the probe image Ip by using the value of the model goodness of fit V computed by the model goodness-of-fit evaluation means 1232. For example, the collation means 1203 presets a threshold value, and if the model goodness of fit V is better than the threshold value (smaller than the threshold value in the case of the formula 16), the target parameter pt for the probe image Ip is recognized to be the same as the target parameter pt for the gallery data Dg.

When there are plural pieces of gallery data Dg, a model goodness of fit V is computed by performing the processes in the 2D-3D model fitting means 1231 and the model goodness-of-fit evaluation means 1232 on a combination of each piece of gallery data and the probe image Ip. The value of the target parameter pt for gallery data Dg having the best model goodness of fit V is recognized as the value of the target parameter pt for the probe image Ip by the collation means 1203.

Alternatively, the value of the target parameter pt for the probe image Ip may be estimated by interpolation using target parameters pt for plural pieces of gallery data Dg having a model goodness of fit better than a certain threshold value.

Specific examples will be described. A personal identification system using facial 3D data will be described as an example. For example, probe data are collated with three pieces of gallery data of three persons A, B, and C. If the gallery data of the person B have the best model goodness of fit, then the probe data are recognized as 3D data of the person B. At that time, even if the three pieces of gallery data have different external parameters such as a direction of a face, the external parameters do not affect the model goodness of fit. Accordingly, personal identification can correctly be performed.

A system for recognizing a pose of an object will be described as another example. For example, probe 3D data are collated with 19 pieces of gallery 3D data that were measured by placing an object at intervals of 10 degrees from 90 degrees leftward through the front to 90 degrees rightward. If a piece of gallery data at 70 degrees rightward has the best model goodness of fit, then a direction of the object when the probe data were measured is recognized as 70 degrees rightward. At that time, even if the 19 pieces of gallery data have different external parameters such as characteristics of the three-dimensional measurement device, the external parameters do not affect the model goodness of fit. Accordingly, the pose of the object can correctly be recognized.

In the present embodiment, 3D data as gallery data include both of 3D shape data and texture data. However, 3D data including only 3D shape data can also be processed in the same manner as described above. Furthermore, the probe image and the gallery data have been described as being formed of one image or one piece of data. Even if either or both of them are formed of plural images or plural pieces of data, the identical process can be performed except that the number of the external parameters pe or weight coefficients in the formulas 18 and 23 is increased by the number of images or pieces of data.

Next, the effects of the present embodiment will be described.

In the present embodiment, a probe image Ip and gallery data Dg are inputted. A model fitting process is performed on the assumption that the target parameter pt to be collated has the same value for both data Ip and Dg. A model goodness of fit V, which is a criterion for the accuracy of the model fitting process, is computed, and the collation is performed with this model goodness of fit V. Thus, for the following reasons, the probe image can be collated with the gallery data without being greatly affected by an absolute accuracy of the model fitting process.

If the target parameter pt to be collated has different values for both data Ip and Dg, then model data I'p and D'g that are similar to the data Ip and Dg cannot be obtained. Therefore, a model goodness of fit V is extremely worsened. On the other hand, if the target parameter pt to be collated has the same value for both data Ip and Dg, then model data I'p and D'g that are similar to the data Ip and Dg can always be obtained in principle. Therefore, a model goodness of fit V has a good value. As a result, a significant difference is produced in the values of the model goodness of fit V between the case where the target parameter pt to be collated has the same value for both data Ip and Dg and the case where the target parameter pt to be collated has different values for the data Ip and Dg. In the collation judgment with one piece of gallery data Dg, a threshold value is set at an intermediate value of that difference. Even if a value of the model goodness of fit V changes to some extent due to some decrease of the accuracy of the fitting process, it is possible to clearly distinguish between gallery data having the same target parameter pt as that of the probe image and gallery data not having the same target parameter, without being affected by the changes of the model goodness of fit V because of a large difference from the threshold value. Furthermore, in a collation judgment with plural pieces of gallery data Dg, a model goodness of fit V computed for a combination of gallery data Dg having the same target parameter pt as that of the probe image and the probe image Ip has a better value over model goodnesses of fit V computed for other combinations. Therefore, even if the value of the model goodness of fit V changes to some extent due to some decrease of the accuracy of the fitting process, it is possible to specify gallery data having a target parameter pt that matches best with that of the probe image, without being affected by the changes of the model goodness of fit V.

By contrast, in the prior art in which independent fitting processes are performed to estimate a target parameter ptp and an external parameter pep from a probe image Ip and to estimate a target parameter ptg and an external parameter peg from gallery data Dg so as to compute a similarity between ptp and ptg, as to a similarity between ptp and ptg, a difference between a case where the target parameters ptp and ptg to be collated have the same value for both data Ip and Dg and a case where the target parameters ptp and ptg to be collated have different values for both data Ip and Dg is less significant as compared to the difference of the values of the model goodness of fit V in the present embodiment. Accordingly, the prior art system is greatly affected by an absolute accuracy of the fitting process.

(Fourth Embodiment)

In the third embodiment, a probe image Ip is inputted and collated with gallery data Dg of three-dimensional data. In a collation apparatus according to the present embodiment, three-dimensional probe data Dp are inputted and collated with a gallery image Ig.

Figure 11:
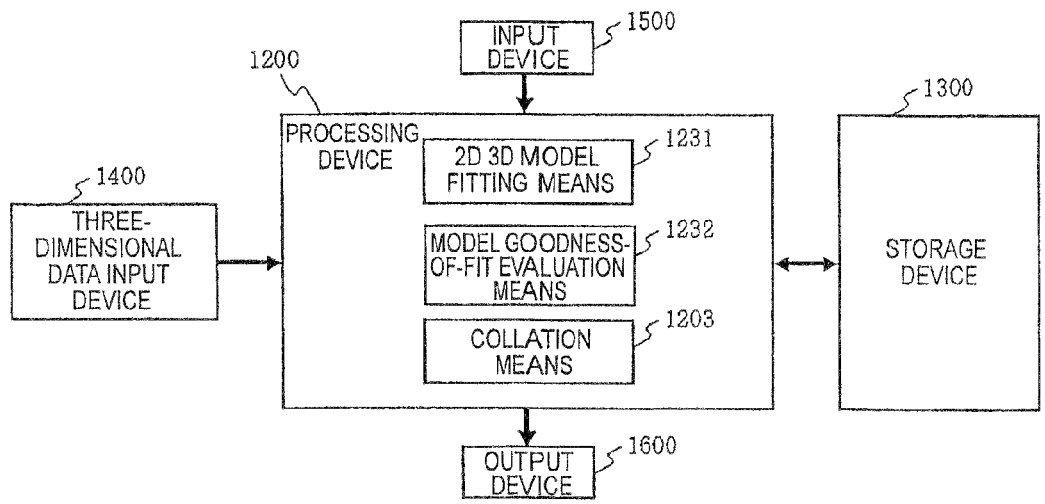
FIG. 11 is a block diagram of a fourth embodiment of the present invention.

Compared with the third embodiment shown in FIG. 8, the present embodiment shown in FIG. 11 differs in that it has a three-dimensional data input device 1400 instead of the image input device 1100.

The three-dimensional data input device 1400 is a device for inputting probe data of three-dimensional data to the processing device 1200 and may be a three-dimensional shape measurement device or other devices for reading probe data from a storage device, which is not shown in the drawings, or for receiving probe data via a network.

The storage device 1300 stores programs executed by the processing device 1200 and various types of data used for collation. The various types of data include a gallery image and data relating to an image variation model and a three-dimensional data variation model. The gallery image may be prestored in the storage device 1300. The gallery image may be read from an image input device, which is not shown in the drawings, each time they are needed. The image variation model and the three-dimensional data variation model are the same as the image variation model 1235 and the 3D data variation model 1234 in the third embodiment, respectively.

Figure 12:
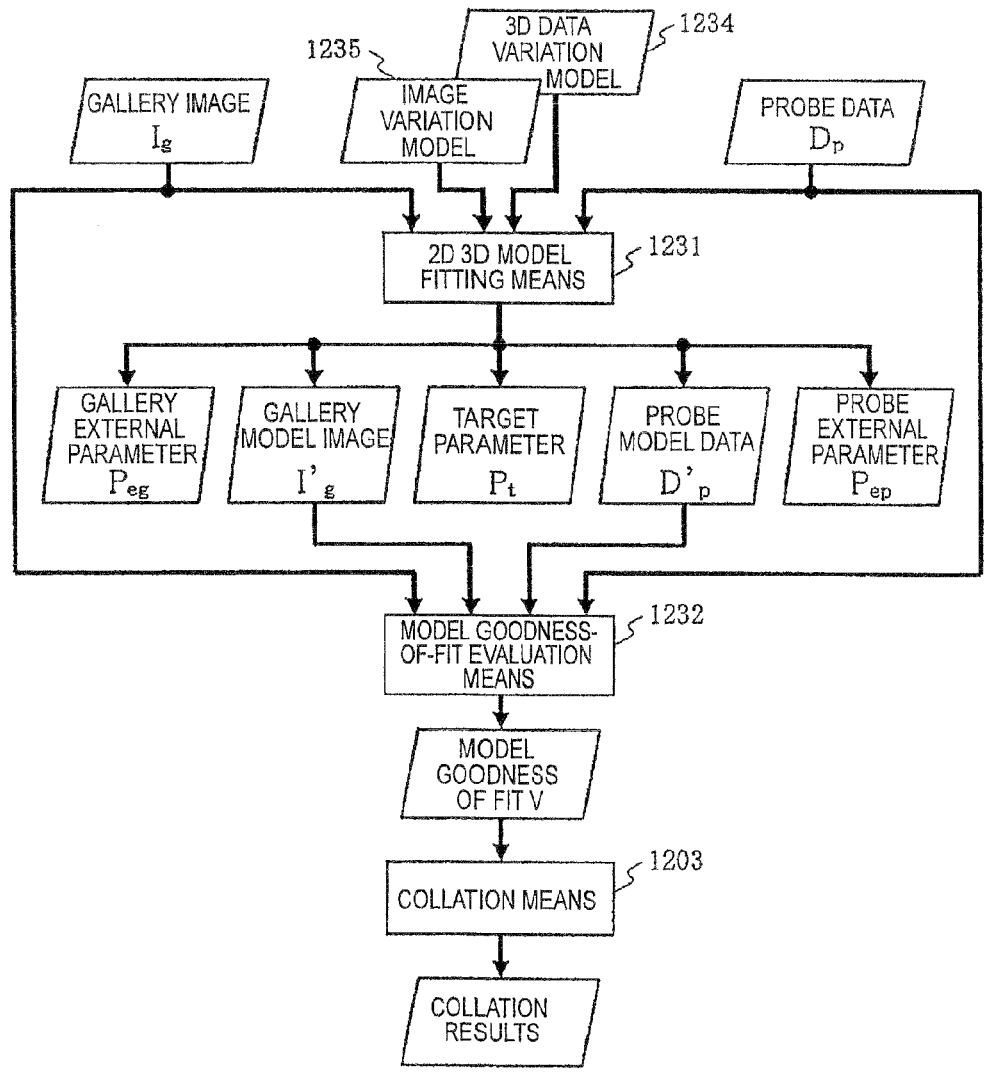
FIG. 12 is a diagram showing a flow of a process in the fourth embodiment of the present invention.

Referring to FIG. 12, the 2D-3D model fitting means 1231 receives inputs of probe data Dp and a gallery image Ig. Assuming that a target parameter pt representing a variable element to be recognized has the same value for both data Dp and Ig and that a parameter pe representing other variable elements may have different values for the data Dp and Ig, the 2D-3D model fitting means 1231 computes values of those parameters pt and pe by using the aforementioned 3D data variation model 1234 so as to generate model data I'p that are closest to the probe data Dp (model data in which the following cost function has a small value) and also by using the aforementioned image variation model 1235 so as to generate a model image I'g that is closest to the gallery image Ig. Here, the external parameter for the probe data Dp is denoted by pep, and the external parameter for the gallery image Ig is denoted by peg.

Figure 13:
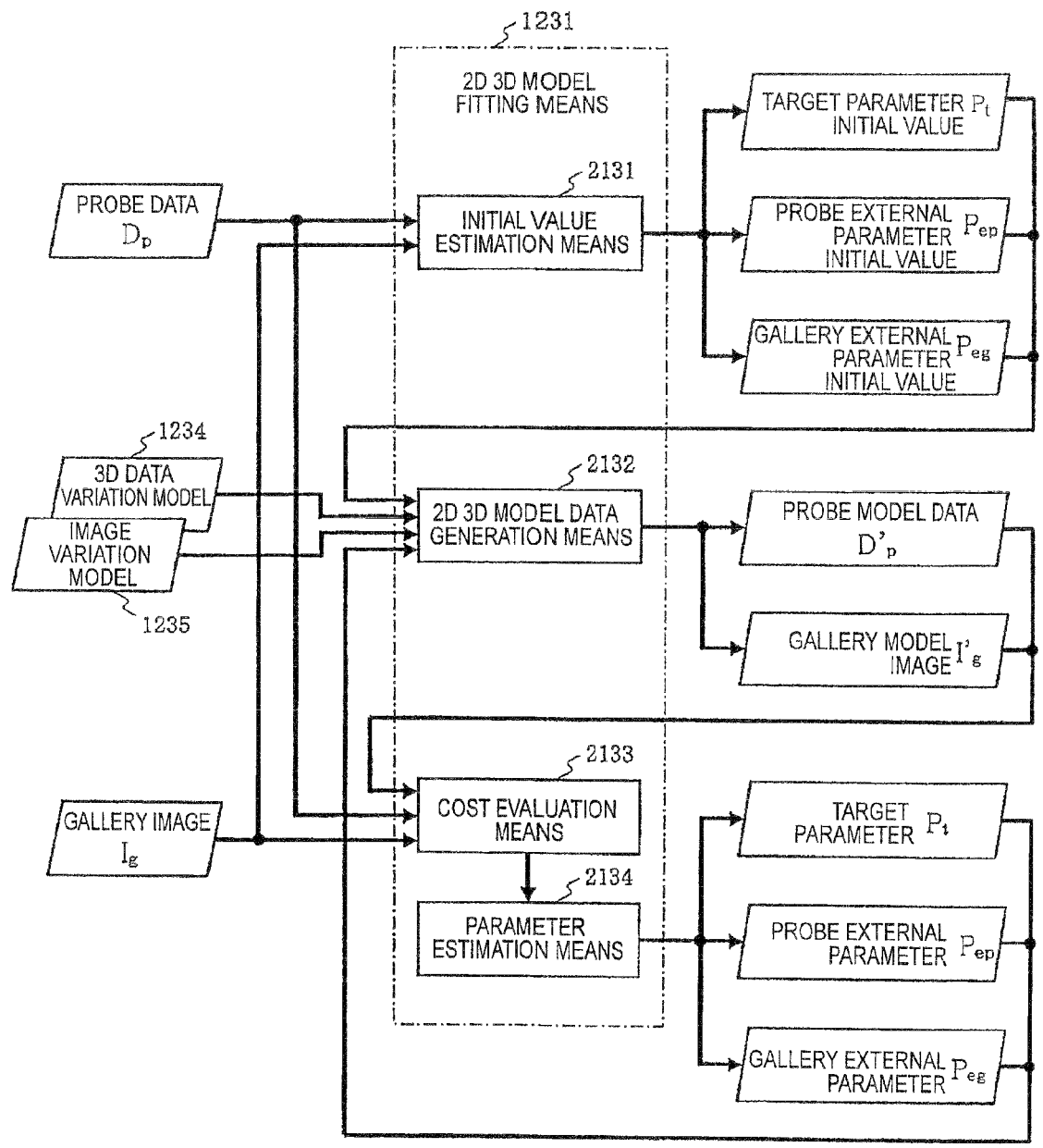
FIG. 13 is a diagram showing a configuration of a 2D-3D model fitting means and its process in the fourth embodiment of the present invention.

Referring to FIG. 13, as with the third embodiment, the 2D-3D model fitting means 1231 has an initial value estimation means 2131, a 2D-3D model data generation means 2132, a cost evaluation means 2133, and a parameter estimation means 2134.

The initial value estimation means 2131 computes initial values of the parameters for the 3D data variable elements of the probe data Dp and the parameters for the image variable elements of the gallery image Ig. Those values may be predetermined known values or values measured by a separate sensor or the like, or may be inputted as information added to the image Ig and the 3D data Dp. The computation of the initial values for the gallery image Ig can be performed in the same manner as with the initial value estimation means 2101 in the first embodiment, and the computation of the initial values for the probe data Dp can be performed in the same manner as with the initial value estimation means 2121 in the second embodiment.

The initial values of the target parameter pt for both data of the probe data Dp and the gallery image Ig, the initial value of the external parameter pep for the probe data Dp, and the initial value of the external parameter peg for the gallery image Ig are outputted to the 2D-3D model data generation means 2132.

The 2D-3D model data generation means 2132 uses the target parameter pt and the external parameters Pep and Peg outputted as the initial values from the initial value estimation means 2131 for the first-time generation of model data and uses the target parameter pt and the external parameters Pep and Peg updated by the parameter estimation means 2134 for subsequent repeated generations. With use of the 3D data variation model 1234 and the image variation model 1235, respectively, the 2D-3D model data generation means 2132 generates probe model data D'p and a gallery model image I'g under the conditions represented by those parameters Pt, Pep, and Peg.

The cost evaluation means 2133 compares the probe data Dp with the probe model data D'p and compares the gallery image Ig with the gallery model image I'g to compute a cost function for fitting. For example, as with the third embodiment, the cost function C may be the weighted sum of square errors of both data to be compared.

The parameter estimation means 2134 updates the value of each of the target parameter Pt and the external parameters Pep and Peg so as to improve the value of the cost function C. Various optimization methods can be used for this purpose. As with the third embodiment, a steepest-descent method can be used for this purpose.

The model goodness-of-fit evaluation means 1232 evaluates the accuracy of the model fitting process in the 2D-3D model fitting means 1231. Specifically, the model fitting process is performed on the assumption that the target parameter pt has the same value. The model goodness-of-fit evaluation means 1232 performs a process of computing a model goodness of fit V, which shows whether or not the image variation model 1235 and the 3D data variation model 1234 conform to the gallery image Ig and the probe data Dp on that assumption. The model goodness-of-fit evaluation means 1232 in the present embodiment receives inputs of the probe model data D'p, the probe data Dp, the gallery model image I'g, and the gallery image Ig. The model goodness-of-fit evaluation means 1232 sums their errors and outputs the summed value as a model goodness of fit V. Various feature values may be used to calculate those errors. For example, as with the third embodiment, it is possible to use the weighted sum of square errors of three-dimensional coordinates and texture luminance values.

As with the third embodiment, the collation means 1203 performs a collation judgment between the gallery image Ig and the probe data Dp by using the value of the model goodness of fit V computed by the model goodness-of-fit evaluation means 1232.

Next, the effects of the present embodiment will be described.

In the present embodiment, probe data Dp and a gallery image Ig are inputted. A model fitting process is performed on the assumption that the target parameter pt to be collated has the same value for both data Dp and Ig. A model goodness of fit V, which is a criterion for the accuracy of the model fitting process, is computed, and the collation is performed with this model goodness of fit V. Thus, for the following reasons, the probe data can be collated with the gallery image without being greatly affected by an absolute accuracy of the model fitting process.

If the target parameter pt to be collated has different values for both data Dp and Ig, then model data D'p and I'g that are similar to the data Dp and Ig cannot be obtained. Therefore, a model goodness of fit V is extremely worsened. On the other hand, if the target parameter pt to be collated has the same value for both data Dp and Ig, then model data D'p and I'g that are similar to the data Dp and Ig can always be obtained in principle. Therefore, a model goodness of fit V has a good value. As a result, a significant difference is produced in the values of the model goodness of fit V between the case where the target parameter pt to be collated has the same value for both data Dp and Ig and the case where the target parameter pt to be collated has different values for the data Dp and Ig. In the collation judgment with one gallery image Ig, a threshold value is set at an intermediate value of that difference. Even if a value of the model goodness of fit V changes to some extent due to some decrease of the accuracy of the fitting process, it is possible to clearly distinguish between a gallery image having the same target parameter pt as that of the probe data and a gallery image not having the same target parameter, without being affected by the changes of the model goodness of fit V because of a large difference from the threshold value. Furthermore, in a collation judgment with plural sets of gallery images Ig, a model goodness of fit V computed for a combination of a gallery image Ig having the same target parameter pt as that of the probe data and the probe data Dp has a better value over model goodnesses of fit V computed for other combinations. Therefore, even if the value of the model goodness of fit V changes to some extent due to some decrease of the accuracy of the fitting process, it is possible to specify a gallery image having a target parameter pt that matches best with that of the probe data, without being affected by the changes of the model goodness of fit V.

By contrast, in the prior art, independent fitting processes are performed to estimate a target parameter ptp and an external parameter pep from probe data Dp and to estimate a target parameter ptg and an external parameter peg from a gallery image Ig. Then a similarity between ptp and ptg is computed. Accordingly, as to a similarity between ptp and ptg, a difference between a case where the target parameters ptp and ptg to be collated have the same value for both data Dp and Ig and a case where the target parameters ptp and ptg to be collated have different values for both data Dp and Ig is less significant as compared to the difference of the values of the model goodness of fit V in the present embodiment. Thus, the prior art system is greatly affected by an absolute accuracy of the fitting process.

(Fifth Embodiment)

Next, a fifth embodiment of the present invention will be described below.

Figure 14:
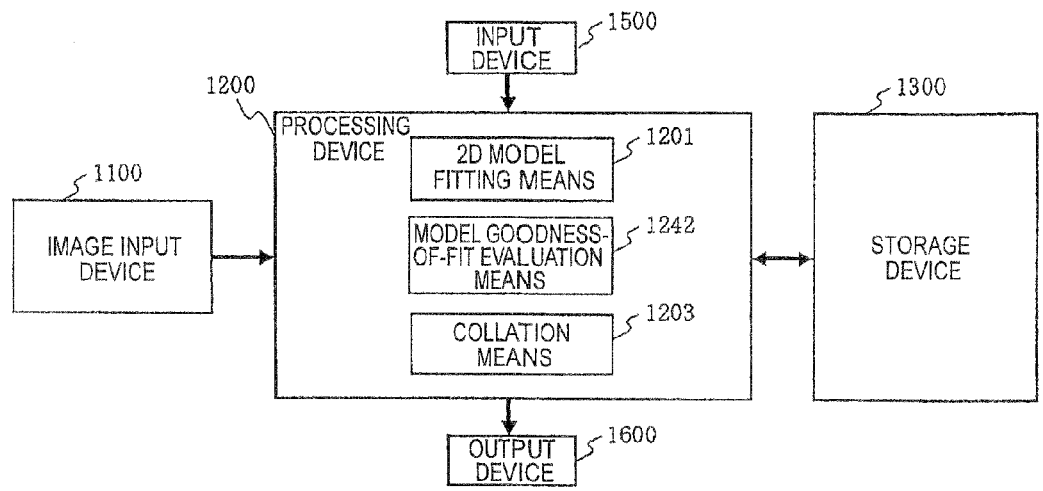
FIG. 14 is a block diagram of a fifth embodiment of the present invention.

As compared to the first embodiment shown in FIG. 2, the present embodiment shown in FIG. 14 differs in that the processing device 1200 has a model goodness-of-fit evaluation means 1242 instead of the model goodness-of-fit evaluation means 1202 and that the storage device 1300 stores reference information relating parameters for a gallery image and a probe image which is used for computation of a model goodness of fit in the model goodness-of-fit evaluation means 1242.

Various types of information can be used as reference information relating to parameters for a gallery image. For example, allowable ranges of the parameters, a probability distribution of values of the parameters, separately estimated or known correct values, and the like may be used. Similarly, examples of reference information relating to parameters for a probe image include allowable ranges of the parameters, a probability distribution of values of the parameters, separately estimated or known correct values, and the like.

Figure 15:
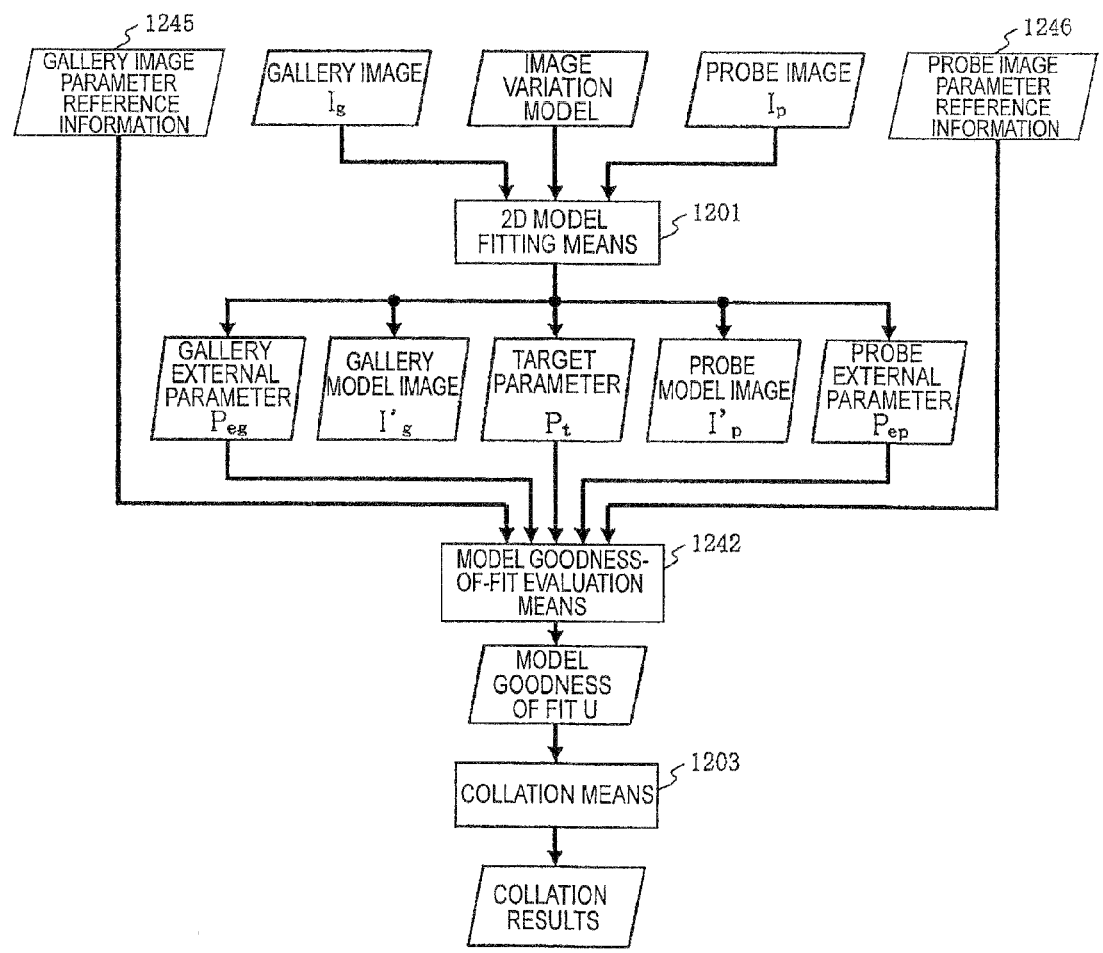
FIG. 15 is a diagram showing a flow of a process in the fifth embodiment of the present invention.

Referring to FIG. 15, the model goodness-of-fit evaluation means 1242 evaluates the certainty (parameter confidence factor) of values of a group of parameters p (a vector including a target parameter pt, a probe external parameter pep, and a gallery external parameter peg as its components) which have been estimated by the 2D model fitting means 1201, which operates in the same manner as in the first embodiment, with reference to gallery image parameter reference information 1245 and probe image parameter reference information 1246 stored in the storage device 1300. The model goodness-of-fit evaluation means 1242 outputs the parameter confidence factor as a model goodness of fit U. Some computation methods of a model goodness of fit U will be described below.

1) First Computation Method of a Model Goodness of Fit U

In this method, the model goodness-of-fit evaluation means 1242 evaluates whether or not parameters pt, pep, and peg estimated by the 2D model fitting means 1201 are within an allowable range. In this case, data representing an allowable range of an estimated value pi of the ith parameter are prestored as the gallery image parameter reference information 1245 and the probe image parameter reference information 1246 in the storage device 1300. For example, assuming that the range is defined by upper and lower limits (pi0, pi1) and $pi0 \leq pi \leq pi1$, a model goodness of fit U is computed and outputted in accordance with the following formulas.

$$U = \Sigma i w i u i \quad (24)$$

$$ui = |pi - pi0|2 \quad (\text{if } pi < pi0)$$
$$= 0 \quad (\text{if } pi0 \leq pi \leq pi1)$$
$$= |pi - pi1|2 \quad (\text{if } pi > pi1)$$

Here, wi is a weight for determining the importance of each parameter and is predetermined to have a suitable value. For example, all of wi may be set to be 1.

In this example, a range is given for all parameters (pt, pep, peg). If information is available only for a portion of the parameters, then computation may be performed in accordance with the formula 24 with excluding parameters having no information.

2) Second Computation Method of a Model Goodness of Fit U

In this method, the model goodness-of-fit evaluation means 1242 computes a model goodness of fit U by using errors between values of the parameters pt, pep, and peg estimated by the 2D model fitting means 1201 and values of known parameters. If a correct value of pi has been known by the gallery image parameter reference information 1245 and the probe image parameter reference information 1246, then a process of computing a model goodness of fit U is performed in accordance with the following formula.

$$U = \Sigma i w i |pi - pi0|2 \quad (25)$$

When values are known only for a portion of the parameters, the computation is performed with excluding unknown parameters. Here, wi is a weight for determining the importance of each parameter and is predetermined to have a suitable value. For example, all of wi may be set to be 1.

3) Third Computation Method of a Model Goodness of Fit U

In this method, a probability distribution of values of the parameters is provided. The model goodness-of-fit evaluation means 1242 computes a probability of values of the parameters pt, pep, and pe estimated by the 2D model fitting means 1201 to compute a model goodness of fit U. If the parameter pi is defined by the gallery image parameter reference information 1245 and the probe image parameter reference information 1246 so as to conform to the normal distribution of a variance σi and a mean pim, then a model goodness of fit U is computed in accordance with the following formula. The computation is performed with excluding parameters of which probability distribution has been unknown.

$$U = -\Sigma i (pi - pim)2/\sigma i \qquad (26)$$

It is noted that a smaller value of a model goodness of fit U computed by the aforementioned first to third methods means a better model Furthermore. The computation methods of the value of a model goodness of fit U has been described merely by way of example and may be modified in various ways.

The collation means 1203 is the same as that in the first embodiment. The collation means 1203 uses the value of the model goodness of fit U instead of the value of the model goodness of fit V to judge whether or not the probe image has the same target parameter as the gallery image, or uses the value of the target parameter of a gallery image having a good model goodness of fit to estimate the value of the target parameter of the probe image.

Next, the effects of the present embodiment will be described.

In the present embodiment, both images of a probe image Ip and a gallery image Ig are inputted. A model fitting process is performed on the assumption that the target parameter pt to be collated has the same value for both images Ip and Ig. A model goodness of fit U, which is a criterion for the accuracy of the model fitting process, is computed, and the collation is performed with this model goodness of fit U. Thus, for the following reasons, the probe image can be collated with the gallery image without being greatly affected by an absolute accuracy of the model fitting process.

If the target parameter pt to be collated has different values for both images Ip and Ig, then model images I'p and I'g that are similar to the images Ip and Ig cannot be obtained. Therefore, estimated values of the parameters pt, pep, and peg become abnormal values, so that a model goodness of fit U is extremely worsened.

On the other hand, if the target parameter pt to be collated has the same value for both images Ip and Ig, then model images I'p and I'g that are similar to the images Ip and Ig can always be obtained in principle. Therefore, estimated values of the parameters pt, pep, and peg become normal values, so that a model goodness of fit U has a good value. As a result, a significant difference is produced in the values of the model goodness of fit U between the case where the target parameter pt to be collated has the same value for both images Ip and Ig and the case where the target parameter pt to be collated has different values for the images Ip and Ig. In the collation judgment with one gallery image Ig, a threshold value is set at an intermediate value of that difference. Even if a value of the model goodness of fit U changes to some extent due to some decrease of the accuracy of the fitting process, it is possible to clearly distinguish between a gallery image having the same target parameter pt as that of the probe image and a gallery image not having the same target parameter, without being affected by the changes of the model goodness of fit U because of a large difference from the threshold value.

Furthermore, in a collation judgment with plural sets of gallery images Ig, a model goodness of fit U computed for a combination of a gallery image Ig having the same target parameter pt as that of the probe image and the probe image Ip has a better value over model goodnesses of fit U computed for other combinations. Therefore, even if the value of the model goodness of fit U changes to some extent due to some decrease of the accuracy of the fitting process, it is possible to specify a gallery image having a target parameter pt that matches best with that of the probe image, without being affected by the changes of the model goodness of fit V.

By contrast, in the prior art, independent fitting processes are performed to estimate a target parameter ptp and an external parameter pep from a probe image Ip and to estimate a target parameter ptg and an external parameter peg from a gallery image Ig. Then a similarity between ptp and ptg is computed. Accordingly, as to a similarity between ptp and ptg, a difference between a case where the target parameters ptp and ptg to be collated have the same value for both images Ip and Ig and a case where the target parameter ptp and ptg to be collated have different values for both images Ip and Ig is less significant as compared to the difference of the values of the model goodness of fit U in the present embodiment. Thus, the prior art system is greatly affected by an absolute accuracy of the fitting process.

The present embodiment is directed to a system for collating an image with an image and has been described in comparison with the first embodiment. There may be considered an embodiment in which the model goodness-of-fit evaluation means 1222 in the second embodiment is replaced with the model goodness-of-fit evaluation means 1242 in the present embodiment. Furthermore, there may be considered an embodiment in which the model goodness-of-fit evaluation means 1232 in the third or fourth embodiment is replaced with the model goodness-of-fit evaluation means 1242 in the present embodiment.

(Sixth Embodiment)

Next, a sixth embodiment of the present invention will be described below.

Figure 16:
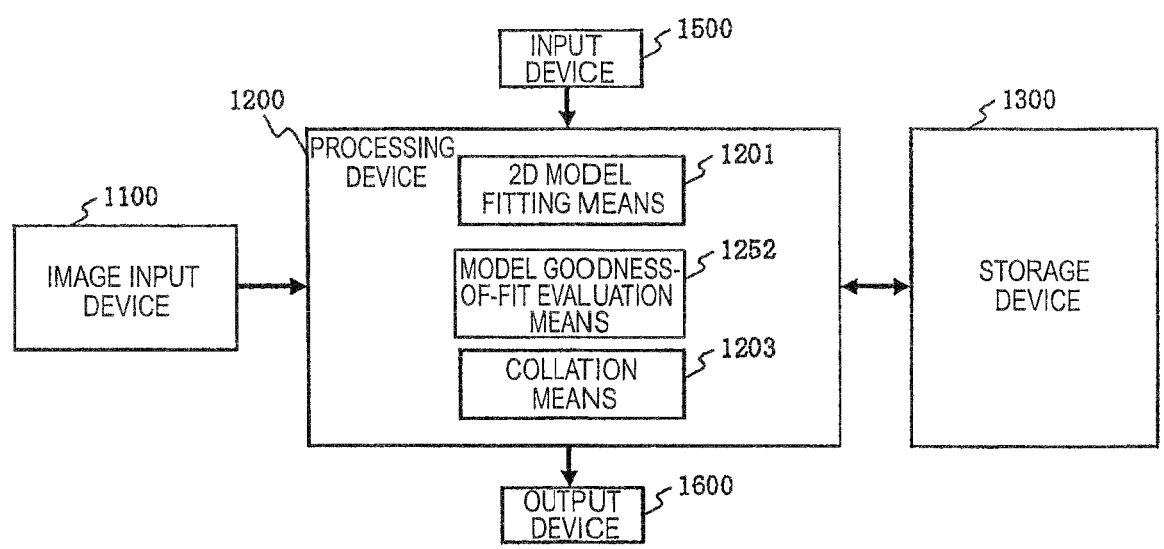
FIG. 16 is a block diagram of a sixth embodiment of the present invention.

As compared to the fifth embodiment shown in FIG. 14, the present embodiment shown in FIG. 16 differs in that the processing device 1200 has a model goodness-of-fit evaluation means 1252 instead of the model goodness-of-fit evaluation means 1242.

Figure 17:
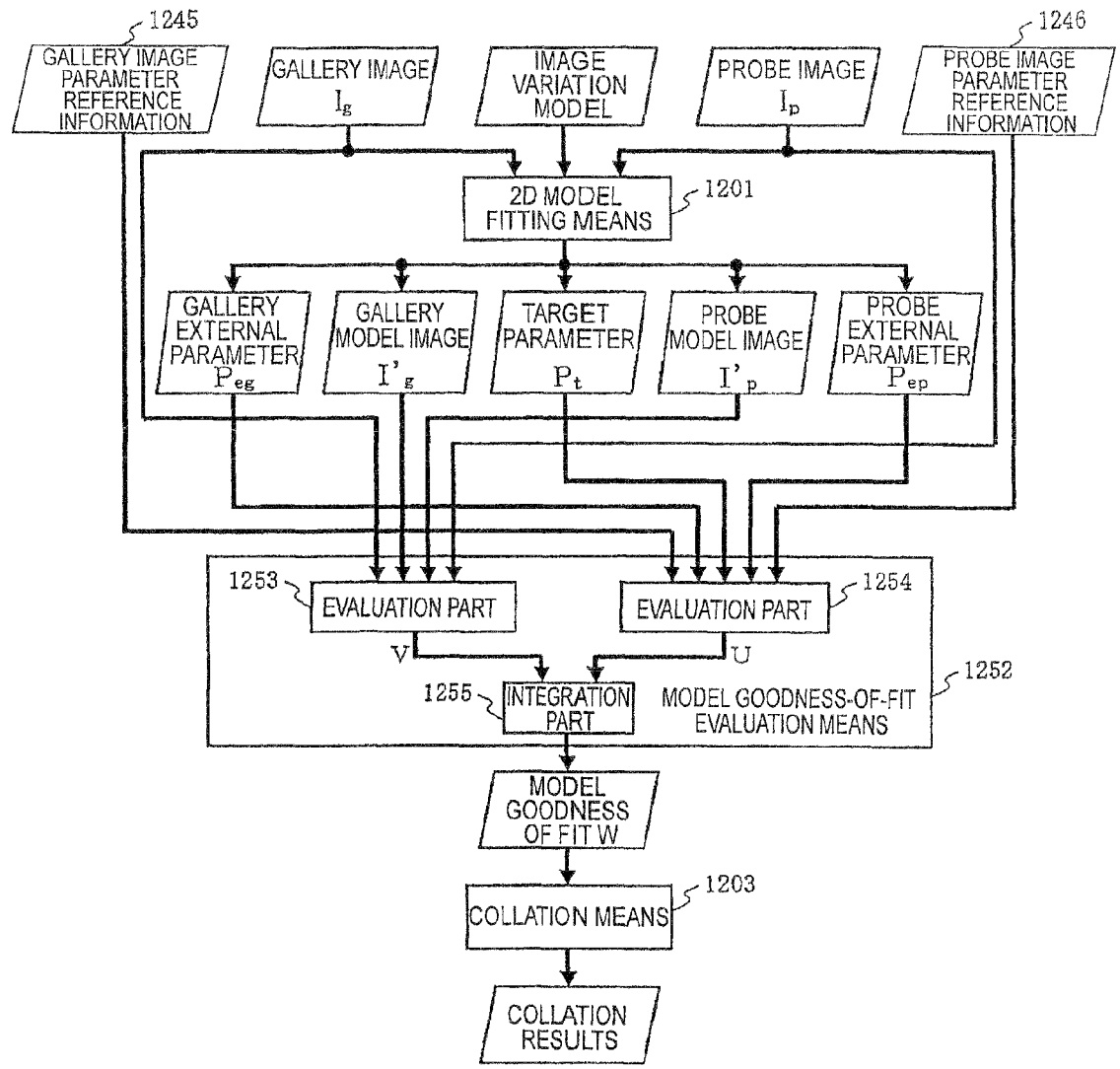
FIG. 17 is a diagram showing a flow of a process in the sixth embodiment of the present invention.

Referring to FIG. 17, the model goodness-of-fit evaluation means 1252 receives inputs of a gallery image Ig, a gallery model image I'g, a probe image Ip, a probe model image I'p, a target parameter pt, a gallery external parameter peg, a probe external parameter pep, gallery image parameter reference information 1245, and probe image parameter reference information 1246. The model goodness-of-fit evaluation means 1252 computes a model goodness of fit W by using both of a model goodness of fit V and a model goodness of fit U and outputs the computed model goodness of fit W.

The model goodness-of-fit evaluation means 1252 has two evaluation parts 1253 and 1254 and an integration part 1255.

The evaluation part 1253 corresponds to the model goodness-of-fit evaluation means 1202 in the first embodiment shown in FIG. 2. The evaluation part 1253 receives inputs of a gallery image Ig, a gallery model image I'g, a probe image Ip, and a probe model image I'p, evaluates their errors to compute a model goodness of fit V, and outputs the model goodness of fit V.

The evaluation part 1254 corresponds to the model goodness-of-fit evaluation means 1242 in the fifth embodiment shown in FIG. 14. The evaluation part 1254 computes a confidence factor of each of the parameters pt, peg, and pep estimated by the model fitting means 1201 with reference to the gallery image parameter reference information 1245 and the probe image parameter reference information 1246 and outputs a model goodness of fit U.

The integration part 1255 computes and outputs a model goodness of fit W, into which the model goodness of fit V and the model goodness of fit U are integrated. Various methods can be used to compute the model goodness of fit W. The model goodness of fit W is computed by the following formula.

$$W = V + wuU \tag{27}$$

Here, wu is a weight coefficient for determining the importance of the model goodness of fit V and the model goodness of fit U and is predetermined to have a suitable value.

The collation means 1203 is substantially the same as that in the first embodiment. The collation means 1203, however, differs from that of the first embodiment in that the collation of whether the target parameter has the same value for the probe image and the gallery image or the estimation of values of the target parameter is performed by using the model goodness of fit W instead of the model goodness of fit V. In this case, for the same reasons as described in the first embodiment and the fifth embodiment, the probe image can be collated with the gallery image without being greatly affected by an absolute accuracy of the model fitting process.

The present embodiment is directed to a system for collating an image with an image and has been described in comparison with the fifth embodiment. There may be considered an embodiment in which the model goodness-of-fit evaluation means 1222 in the second embodiment is replaced with the model goodness-of-fit evaluation means 1252 in the present embodiment. Furthermore, there may be considered an embodiment in which the model goodness-of-fit evaluation means 1232 in the third or fourth embodiment is replaced with the model goodness-of-fit evaluation means 1252 in the present embodiment.

(Seventh Embodiment)

Next, a seventh embodiment of the present invention will be described below.

Figure 18:
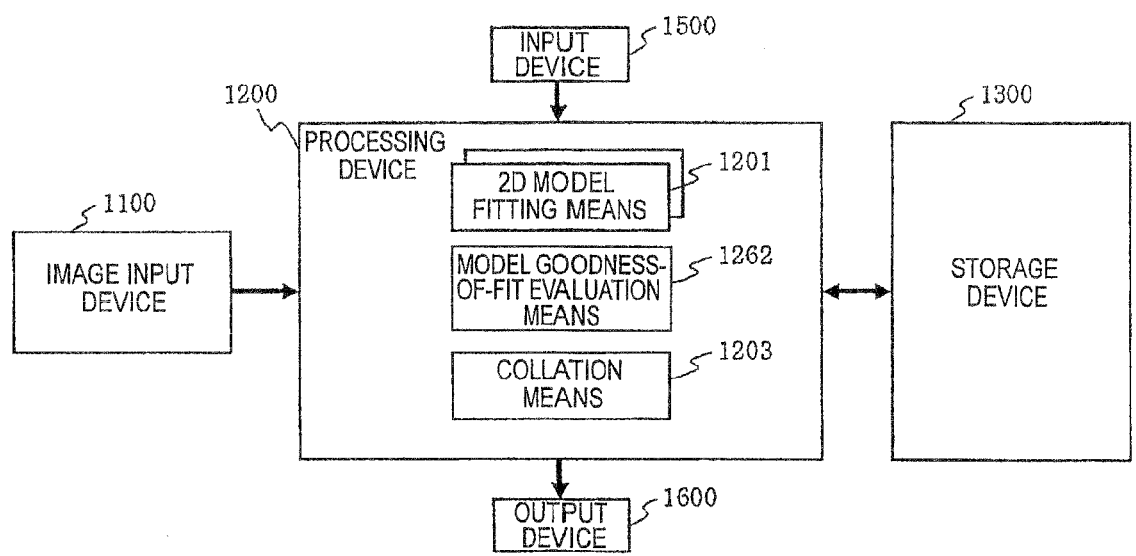
FIG. 18 is a block diagram of a seventh embodiment of the present invention.

As compared to the sixth embodiment shown in FIG. 16, the present embodiment shown in FIG. 18 differs in that the processing device 1200 has a plurality of 2D model fitting means 1201 and that the processing device 1200 has a model goodness-of-fit evaluation means 1262 instead of the model goodness-of-fit evaluation means 1252.

Among a plurality of 2D model fitting means 1201, a first 2D model fitting means is used for simultaneous fitting of a gallery image and a probe image as with the 2D model fitting means 1201 in the sixth embodiment. Other second 2D model fitting means 1201 are used to receive an input of either the gallery image or the probe image and to conduct fitting of an image variation model only to this single image to generate a model image and estimate parameters.

The model goodness-of-fit evaluation means 1262 computes, as a model goodness of fit W, an error between a result of the model fitting to the single image and a result of fitting to both of the images.

Figure 19:
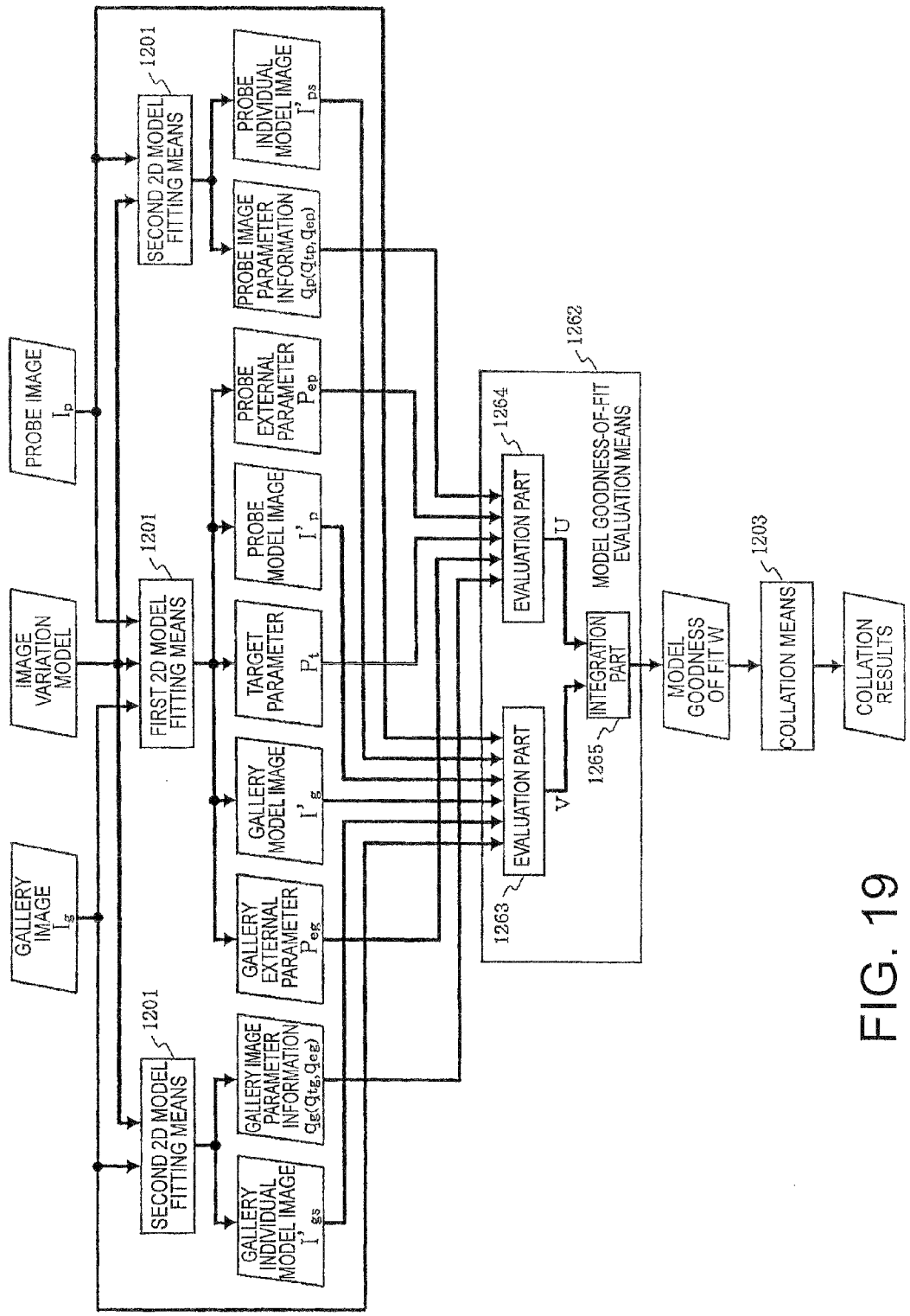
FIG. 19 is a diagram showing a flow of a process in the seventh embodiment of the present invention.

Referring to FIG. 19, the first model fitting means 1201 receives inputs of both of a probe image Ip, which is a recognition target, and a gallery image Ig to be collated with the probe image Ip, performs a model fitting process with use of an image variation model while variable elements to be collated are used as a common parameter, and computes values of parameters that can generate an image that is closest to both of the images Ip and Ig. The generated probe model image I'p and gallery model image I'g and the estimated target parameter pt, probe external parameter pep, and gallery external parameter peg are outputted to the model goodness-of-fit evaluation means 1262.

One of the second model fitting means 1201 receives only an input of the probe image Ip and computes values of the parameters that can generate an image that is closest to the probe image Ip with use of the image variation model. Various methods corresponding to the image variation model can be used for this purpose. For example, the technique of Prior Art Reference 1 or the technique of Prior Art Reference 2 can be used. The estimated target parameter is defined as a probe individual target parameter qtp, and the external parameter is defined as a probe individual external parameter qep. Those parameters are correctively defined as probe image parameter information qp. The generated probe individual model image I'ps is outputted together with those parameters.

The other of the second model fitting means 1201 receives only an input of the gallery image Ig and computes values of the parameters that can generate an image that is closest to the gallery image Ig with use of the image variation model. Various methods corresponding to the image variation model can be used for this purpose. For example, the technique of Prior Art Reference 1 or the technique of Prior Art Reference 2 can be used. The estimated target parameter is defined as a gallery individual target parameter qtg, and the external parameter is defined as a gallery individual external parameter qeg. Those parameters are correctively defined as gallery image parameter information qg. The generated gallery individual model image I'gs is outputted together with those parameters.

The model goodness-of-fit evaluation means 1262 receives inputs of the gallery image Ig, the gallery model image I'g, the gallery individual model image I'gs, the probe image Ip, the probe model image I'p, the probe individual model image I'ps, the target parameter pt, the gallery external parameter peg, the probe external parameter pep, the gallery image parameter information qg, and the probe image parameter information qp. The model goodness-of-fit evaluation means 1262 computes a model goodness of fit W by using both of a model goodness of fit V and a model goodness of fit U and outputs the computed model goodness of fit W.

The model goodness-of-fit evaluation means 1262 has two evaluation parts 1263 and 1264 and an integration part 1265.

The evaluation part 1264 is the same as the evaluation part 1254 in the sixth embodiment with the following exceptions. The evaluation part 1264 differs from the evaluation part 1254 in that it computes a parameter confidence factor based on errors of the target parameter pt, the probe external parameter pep, and the gallery external parameter peg outputted from the first model fitting means 1201 with reference to the probe image parameter information qg and the gallery image parameter information qg outputted from the second model fitting means 1201, instead of the gallery image parameter reference information 1254 and the probe image parameter reference information 1246, and outputs the computed parameter confidence factor as a model goodness of fit U.

Various methods may be used to compute the model goodness of fit U. The model goodness of fit U may be computed by the following formula.

$$U = w1|pt-qtp|2 + w2|pt-qtg|2 + w3|pep-qep|2 + w4|peg-qeg|2 \tag{28}$$

Here, w1, w2, w3, and w4 are weight coefficients and are predetermined to have suitable values. The computation method of the model goodness of fit U has been described merely by way of example and may be changed into various computation methods.

The evaluation part 1263 corresponds to the evaluation part 1253 in the sixth embodiment. The evaluation part 1263 receives inputs of the probe image Ip, the gallery image Ig, the probe model image I'p, and the gallery model image I'g outputted from the first model fitting means 1201, and the probe individual model image I'ps and the gallery individual model image I'gs outputted from the second model fitting means 1201. The evaluation part 1263 computes a model goodness of fit V with additionally considering errors between the model images I'ps and I'gs individually generated and the model images I'p and I'g generated by using both probe and gallery images.

Various methods can be used for the computation. For example, the sum of square errors of luminance values of images may be used as shown by the following formula.

$$V = vp|Ip-I'p|2 + vg|Ig-I'g|2 + vps|I'p-I'ps|2 + vgs|I'g-I'gs|2 \quad (29)$$

Here, vp, vg, vps, and vgs are coefficients for adjusting weights and are predetermined to have suitable values. For example, a reciprocal of the number of pixels in each image may be used for those coefficients. Furthermore, those values can be changed adaptively according to conditions. Additionally, an error between Ip and I'ps and an error between Ig and I'gs may be added to the formula 29. Thus, various computation methods may be used. Furthermore, while differences of luminance values of images are used in this example, errors of various image feature values such as an edge and a frequency component can be used.

The integration part 1265 computes a model goodness of fit W, into which the model goodness of fit V and the model goodness of fit U are integrated, and outputs the computed model goodness of fit W. Various methods can be used to compute the model goodness of fit W. For example, the aforementioned formula 27 may be used.

The collation means 1203 is the same as that in the first embodiment except that the collation of whether or not the probe image has the same target parameter as the gallery image or the estimation of the values of the target parameter is performed by using the model goodness of fit W instead of the model goodness of fit V. In this case, for the same reasons as described in the first embodiment and the fifth embodiment, the probe image can be collated with the gallery image without being greatly affected by an absolute accuracy of the model fitting process.

The present embodiment is directed to a system for collating an image with an image and has been described in comparison with the sixth embodiment. There may be considered an embodiment in which the model goodness-of-fit evaluation means 1222 in the second embodiment is replaced with the model goodness-of-fit evaluation means 1262 in the present embodiment. Furthermore, there may be considered an embodiment in which the model goodness-of-fit evaluation means 1232 in the third or fourth embodiment is replaced with the model goodness-of-fit evaluation means 1262 in the present embodiment.

Although the embodiments of the present invention have been described, the present invention is not limited to the above examples. Various other additions and modifications can be made. Furthermore, functions of a collation apparatus according to the present invention can be implemented by hardware, as a matter of course, or can be implemented by a computer and a program. The program is stored in a computer-readable storage medium, such as a magnetic disk or a semiconductor memory, and provided via the computer-readable storage medium. The program is read by the computer, for example, when the computer is booted up. The program controls operations of the computer so that the computer serves as a collation apparatus as described in the above embodiments and executes the aforementioned processes.

Industrial Applicability

The present invention can be used for an object recognition system, method, and program which can obtain high recognition performance even under such conditions that the accuracy of estimated parameters is lowered due to decrease of the fitting accuracy when an image variation model or a three-dimensional data variation model is fitted to a recognition target of an image or three-dimensional data so as to estimate variable elements. Particularly, the present invention can be used for an object recognition system, method, and program which compare a recognition target image or three-dimensional data that have been photographed under diverse variable environments with a registered image or three-dimensional data and can recognize with high accuracy that the photographed object is the same object as the registered image or three-dimensional data or that the conditions such as a state or a pose of the object, illumination conditions, and a camera used to photograph are the same as in the registered image or three-dimensional data.

The invention claimed is:

1. A collation apparatus for collating target data of an image or three-dimensional data of an object with reference data, the collation apparatus characterized by comprising:
    storage means for storing a variation model capable of generating model data of an image or three-dimensional data of an object by adjusting values of a plurality of parameters;
    model fitting means for defining, among the plurality of parameters, a parameter representing a judgement target of which sameness between the target data and the reference data is to be judged as a target parameter and other parameters as an external parameter, and for generating target model data that are most similar to the target data and reference model data that are most similar to the reference data based on the variation model under a condition in which the target parameter is set to be the same for the target data and the reference data; and
    model goodness-of-fit evaluation means for computing a model goodness of fit of the target model data and the reference model data to the target data and the reference data.

2. The collation apparatus as recited in claim 1, characterized by comprising collation means for comparing the computed model goodness of fit with a predetermined threshold value to judge the sameness between a judgement target of the target data and a judgement target of the reference data.

3. The collation apparatus as recited in claim 2, characterized in that the target parameter is a parameter describing a kind of an object, and the collation means is means for judging whether or not an object of the target data is the same as an object of the reference data.

4. The collation apparatus as recited in claim 2, characterized in that the variation model is a model for generating an image or three-dimensional data of a face, the target parameter is a parameter describing an individuality of a person, and the collation means is means for determining whether or not a person of the target data is the same as a person of the reference data.

5. The collation apparatus as recited in claim 2, characterized in that the target parameter is a parameter specifying a position or a pose of an object, and the collation means is means for determining whether or not a position or a pose of an object of the target data is the same as a position or a pose of an object of the reference data.

6. The collation apparatus as recited in claim 2, characterized in that the variation model is a model for generating an image or three-dimensional data of a face, the target parameter is a parameter specifying a facial expression of a person, and the collation means is means for determining whether or not a facial expression of the target data is the same as a facial expression of the reference data.

7. The collation apparatus as recited in claim 1, characterized by comprising collation means for repeating processes of the model fitting means and the model goodness-of-fit evaluation means on each combination of each of plural pieces of reference data and the target data and for setting a value of the target parameter in a combination having the best model goodness of fit as an estimate value of the target parameter for the target data.

8. The collation apparatus as recited in claim 1, characterized by comprising collation means for repeating processes of the model fitting means and the model goodness-of-fit evaluation means on each combination of each of plural pieces of reference data and the target data and for setting a value computed from the target parameter in a plurality of combinations having a model goodness of fit better than a predetermine threshold value as an estimate value of the target parameter for the target data.

9. The collation apparatus as recited in claim 1, characterized in that:
the model goodness-of-fit evaluation means:
computes an error between the generated target model data and the target data and an error between the generated reference model data and the reference data, and
computes the model goodness of fit from the computed errors.

10. The collation apparatus as recited in claim 9, characterized in that the model fitting means estimates values of the parameters optimum to generate target individual model data similar to the target data from the variation model and values of the parameters optimum to generate reference individual model data similar to the reference data from the variation model, under a condition in which the value of the target parameter is not necessarily the same for the target data and the reference data, and
the model goodness-of-fit evaluation means computes the model goodness of fit with additional consideration of at least one of an error between the target individual model data and the target data, an error between the reference individual model data and the reference data, an error between the target model data and the target individual model data, and an error between the reference model data and the reference individual model data.

11. The collation apparatus as recited in claim 1, characterized in that:
the model goodness-of-fit evaluation means:
computes a parameter confidence factor representing certainty of the estimated values of the parameters with reference to predetermined parameter reference information, and
computes the model goodness of fit from the computed parameter confidence factor.

12. The collation apparatus as recited in claim 11, characterized in that the parameter reference information includes an allowable range of the value of the parameter.

13. The collation apparatus as recited in claim 11, characterized in that the parameter reference information includes a correct value of the parameter.

14. The collation apparatus as recited in claim 11, characterized in that the parameter reference information includes a probability distribution of the value of the parameter.

15. The collation apparatus as recited in claim 11, characterized in that the model fitting means estimates values of the parameters optimum to generate target individual model data similar to the target data from the variation model and values of the parameters optimum to generate reference individual model data similar to the reference data from the variation model, under a condition in which the value of the target parameter is not necessarily the same for the target data and the reference data, and
the model goodness-of-fit evaluation means sets the estimated values of the parameters for the target individual model data and the estimated values of the parameters for the reference individual model data as the parameter reference information.

16. The collation apparatus as recited in claim 1, characterized in that:
the model goodness-of-fit evaluation means:
computes an error between the generated target model data and the target data and an error between the generated reference model data and the reference data and computes a parameter confidence factor representing certainty of the estimated values of the parameters with reference to predetermined parameter reference information, and
computes the model goodness of fit from the computed errors and parameter confidence factor.

17. The collation apparatus as recited in claim 1, characterized in that the variation model is an image variation model including three-dimensional models of various objects for selecting a three-dimensional model of a specified object according to a parameter specifying the object, deforming the selected three-dimensional model according to a parameter such as a state or a pose of the object, an illumination condition, or a characteristic of a camera, and generating an image under a condition the parameter represents by using computer graphics.

18. The collation apparatus as recited in claim 1, characterized in that the variation model is an image variation model for computing a three-dimensional model of an object in a state according to a parameter specifying an individuality or a state of the object, deforming the computed three-dimensional model according to a parameter such as a pose of the object, an illumination condition, or a characteristic of a camera, and generating an image under a condition the parameter represents by using computer graphics.

19. The collation apparatus as recited in claim 1, characterized in that the variation model is a three-dimensional data variation model including three-dimensional models of various objects for selecting a three-dimensional model of a specified object according to a parameter specifying the object and deforming the selected three-dimensional model according to a parameter such as a state or a pose of the object, an illumination condition, or a characteristic of a camera.

20. The collation apparatus as recited in claim 1, characterized in that the variation model is a three-dimensional data variation model for computing a three-dimensional model of an object in a state according to a parameter specifying an individuality or a state of the object and deforming the computed three-dimensional model according to a parameter such as a pose of the object, an illumination condition, or a characteristic of a camera.

21. A collation method of collating target data of an image or three-dimensional data of an object with use of a computer, the collation method characterized by including:

a first step for the computer to use a variation model capable of generating model data of an image or three-dimensional data of an object by adjusting values of a plurality of parameters, to define, among the plurality of parameters, a parameter representing a judgement target of which sameness between the target data and the reference data is to be judged as a target parameter and other parameters as an external parameter, and to generate target model data that are most similar to the target data and reference model data that are most similar to the reference data based on the variation model under a condition in which the target parameter is set to be the same for the target data and the reference data; and a second step for the computer to compute a model goodness of fit of the target model data and the reference model data to the target data and the reference data.

22. The collation method as recited in claim 21, characterized by further including a third step for the computer to compare the computed model goodness of fit with a predetermined threshold value to judge the sameness between a judgement target of the target data and a judgement target of the reference data.

23. The collation method as recited in claim 21, characterized by further including a third step for the computer to repeat the first and second steps on each combination of each of plural pieces of reference data and the target data and to set a value of the target parameter in a combination having the best model goodness of fit as an estimate value of the target parameter for the target data.

24. The collation method as recited in claim 21, characterized by further including a third step for the computer to repeat the first and second steps on each combination of each of plural pieces of reference data and the target data and to set a value computed from the target parameter in a plurality of combinations having a model goodness of fit better than a predetermine threshold value as an estimate value of the target parameter for the target data.

25. The collation method as recited in claim 21, characterized in that the second step comprises computing an error between the generated target model data and the target data and an error between the generated reference model data and the reference data, and computing the model goodness of fit from the computed errors.

26. The collation method as recited in claim 25, characterized in that the computer:

estimates values of the parameters optimum to generate target individual model data similar to the target data from the variation model and values of the parameters optimum to generate reference individual model data similar to the reference data from the variation model, under a condition in which the value of the target parameter is not necessarily the same for the target data and the reference data, and computes the model goodness of fit with additional consideration of at least one of an error between the target individual model data and the target data, an error between the reference individual model data and the reference data, an error between the target model data and the target individual model data, and an error between the reference model data and the reference individual model data.

27. The collation method as recited in claim 21, characterized in that the second step comprises computing a parameter confidence factor representing certainty of the estimated values of the parameters with reference to predetermined parameter reference information, and computing the model goodness of fit from the computed parameter confidence factor.

28. The collation method as recited in claim 27, characterized in that the parameter reference information includes an allowable range of the value of the parameter.

29. The collation method as recited in claim 27, characterized in that the parameter reference information includes a correct value of the parameter.

30. The collation method as recited in claim 27, characterized in that the parameter reference information includes a probability distribution of the value of the parameter.

31. The collation method as recited in claim 27, characterized in that the computer estimates values of the parameters optimum to generate target individual model data similar to the target data from the variation model and values of the parameters optimum to generate reference individual model data similar to the reference data from the variation model, under a condition in which the value of the target parameter is not necessarily the same for the target data and the reference data, and the computer sets the estimated values of the parameters for the target individual model data and the estimated values of the parameters for the reference individual model data as the parameter reference information.

32. The collation method as recited in claim 21, characterized in that the second step comprises computing an error between the generated target model data and the target data and an error between the generated reference model data and the reference data, computing a parameter confidence factor representing certainty of the estimated values of the parameters with reference to predetermined parameter reference information, and computing the model goodness of fit from the computed errors and parameter confidence factor.

33. A program embodied in a non-transitory computer-readable medium for providing a computer for collating target data of an image or three-dimensional data of an object with reference data with functions, the computer having storage means for storing a variation model capable of generating model data of an image or three-dimensional data of an object by adjusting values of a plurality of parameters, the functions including:

model fitting means for using the variation model stored in the storage means, for defining, among the plurality of parameters, a parameter representing a judgement target of which sameness between the target data and the reference data is to be judged as a target parameter and other parameters as an external parameter, and for generating target model data that are most similar to the target data and reference model data that are most similar to the reference data from the variation model under a condition in which the target parameter is set to be the same for the target data and the reference data; and model goodness-of-fit evaluation means for computing a model goodness of fit of the target model data and the reference model data to the target data and the reference data.

34. The program as recited in claim 33, further providing the computer with a function as collation means for comparing the computed model goodness of fit with a predetermined threshold value to judge the sameness between a judgement target of the target data and a judgement target of the reference data.

35. The program as recited in claim 33, further providing the computer with a function as collation means for repeating processes of the model fitting means and the model goodness-of-fit evaluation means on each combination of each of plural pieces of reference data and the target data and for setting a value of the target parameter in a combination having the best model goodness of fit as an estimate value of the target parameter for the target data.

36. The program as recited in claim 33, further providing the computer with a function as collation means for repeating processes of the model fitting means and the model goodness-of-fit evaluation means on each combination of each of plural pieces of reference data and the target data and for setting a value computed from the target parameter in a plurality of combinations having a model goodness of fit better than a predetermine threshold value as an estimate value of the target parameter for the target data.

37. The program as recited in claim 33, characterized in that:
the model goodness-of-fit evaluation means:
computes an error between the generated target model data and the target data and an error between the generated reference model data and the reference data, and
computes the model goodness of fit from the computed errors.

38. The program as recited in claim 37, characterized in that the model fitting means estimates values of the parameters optimum to generate target individual model data similar to the target data from the variation model and values of the parameters optimum to generate reference individual model data similar to the reference data from the variation model, under a condition in which the value of the target parameter is not necessarily the same for the target data and the reference data, and
the model goodness-of-fit evaluation means computes the model goodness of fit with additional consideration of at least one of an error between the target individual model data and the target data, an error between the reference individual model data and the reference data, an error between the target model data and the target individual model data, and an error between the reference model data and the reference individual model data.

39. The program as recited in claim 33, characterized in that the model goodness-of-fit evaluation means computes a parameter confidence factor representing certainty of the estimated values of the parameters with reference to predetermined parameter reference information, and computes the model goodness of fit from the computed parameter confidence factor.

40. The program as recited in claim 39, characterized in that the parameter reference information includes an allowable range of the value of the parameter.

41. The program as recited in claim 39, characterized in that the parameter reference information includes a correct value of the parameter.

42. The program as recited in claim 39, characterized in that the parameter reference information includes a probability distribution of the value of the parameter.

43. The program as recited in claim 39, characterized in that the model fitting means estimates values of the parameters optimum to generate target individual model data similar to the target data from the variation model and values of the parameters optimum to generate reference individual model data similar to the reference data from the variation model, under a condition in which the value of the target parameter is not necessarily the same for the target data and the reference data, and
the model goodness-of-fit evaluation means sets the estimated values of the parameters for the target individual model data and the estimated values of the parameters for the reference individual model data as the parameter reference information.

44. The program as recited in claim 33, characterized in that:
the model goodness-of-fit evaluation means:
computes an error between the generated target model data and the target data and an error between the generated reference model data and the reference data and computes a parameter confidence factor representing certainty of the estimated values of the parameters with reference to predetermined parameter reference information, and
computes the model goodness of fit from the computed errors and parameter confidence factor.

* * * * *